(12) United States Patent
Singh et al.

(10) Patent No.: US 12,302,271 B2
(45) Date of Patent: May 13, 2025

(54) NETWORK NODE, A FIRST WIRELESS DEVICE, A SECOND WIRELESS DEVICE AND METHODS THEREIN FOR ENABLING A TIMING REFERENCE

(71) Applicant: Telefonaktiebolaget LM Ericsson (publ), Stockholm (SE)

(72) Inventors: Bikramjit Singh, Kirkkonummi (FI); Antonino Orsino, Kirkkonummi (FI); Muhammad Ikram Ashraf, Espoo (FI); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 114 days.

(21) Appl. No.: 17/769,364

(22) PCT Filed: Oct. 5, 2020

(86) PCT No.: PCT/SE2020/050937
§ 371 (c)(1),
(2) Date: Apr. 15, 2022

(87) PCT Pub. No.: WO2021/076029
PCT Pub. Date: Apr. 22, 2021

(65) Prior Publication Data
US 2024/0147395 A1    May 2, 2024

Related U.S. Application Data

(60) Provisional application No. 62/916,937, filed on Oct. 18, 2019.

(51) Int. Cl.
*H04W 56/00* (2009.01)
*H04W 92/18* (2009.01)

(52) U.S. Cl.
CPC ... *H04W 56/0045* (2013.01); *H04W 56/0065* (2013.01); *H04W 92/18* (2013.01)

(58) Field of Classification Search
CPC ......... H04W 56/0045; H04W 56/0065; H04W 92/18; H04W 76/14
See application file for complete search history.

(56) References Cited

U.S. PATENT DOCUMENTS 11,995,996 B1 * 5/2024 Puglisi .................. B64C 39/024
2017/0289934 A1 10/2017 Sheng et al.
(Continued)

FOREIGN PATENT DOCUMENTS

EP    2928241 A1    10/2015
WO    2015065262 A1    5/2015
(Continued)

OTHER PUBLICATIONS

3GPP, "3GPP TS 38.211 V15.6.0", 3rd Generation Partnership Project; Technical Specification Group Radio Access Network; NR; Physical channels and modulation (Release 15), Jun. 2019, 1-97.
(Continued)

*Primary Examiner* — Afshawn M Towfighi
(74) *Attorney, Agent, or Firm* — Murphy, Bilak & Homiller, PLLC

(57) ABSTRACT

A method performed by a network node (110) in a wireless communications network (100) for enabling a timing reference in a second wireless device (122) for use in Sidelink, SL, transmissions over a SL communication link (133) with a first wireless device (121) is provided. The network node estimates (201) a propagation delay of SL transmissions over the SL communication link (133) between the first and second wireless device (122). Then, the network node (110) transmits, to the second wireless device (122), timing reference information based on a timing reference originating
(Continued)

from a time reference node in a wireless communications network (100), and on the estimated propagation delay of SL transmissions over the SL communication link (133) between the first and second wireless device (122). A network node (110) for enabling a timing reference in a second wireless device (122) for use in SL transmissions over a SL communication link (133) with a first wireless device (121) is also provided. A first wireless (121), a second wireless device (122) and methods therein are also provided, as well as, computer programs and carriers.

23 Claims, 13 Drawing Sheets

(56) References Cited

U.S. PATENT DOCUMENTS

| | | | | |
|---|---|---|---|---|
| 2018/0102807 | A1* | 4/2018 | Chen | H04L 27/2657 |
| 2020/0112975 | A1* | 4/2020 | Moon | H04L 47/28 |
| 2020/0120458 | A1* | 4/2020 | Aldana | H04W 12/069 |
| 2020/0228220 | A1* | 7/2020 | Joseph | H04J 3/0673 |
| 2020/0259896 | A1* | 8/2020 | Sachs | H04W 56/0065 |
| 2020/0260231 | A1* | 8/2020 | Ganesan | H04B 7/0617 |
| 2020/0267692 | A1* | 8/2020 | Wu | H04W 72/04 |
| 2021/0051619 | A1* | 2/2021 | Gulati | H04W 56/005 |
| 2021/0105790 | A1* | 4/2021 | Lin | H04W 72/56 |
| 2021/0243709 | A1* | 8/2021 | Zhang | H04W 56/0045 |
| 2021/0243720 | A1* | 8/2021 | Farag | H04B 7/086 |
| 2023/0075864 | A1* | 3/2023 | Elazzouni | H04L 47/2416 |
| 2024/0306108 | A1* | 9/2024 | Liang | H04W 56/0015 |
| 2024/0314725 | A1* | 9/2024 | Duan | G01S 5/0236 |

FOREIGN PATENT DOCUMENTS

| | | |
|---|---|---|
| WO | 2017134235 A1 | 8/2017 |
| WO | 2017134605 A1 | 8/2017 |
| WO | 2018088951 A1 | 5/2018 |
| WO | 2021066730 A1 | 4/2021 |
| WO | 2021066732 A1 | 4/2021 |

OTHER PUBLICATIONS

3GPP, "3GPP TR 38.825 V16.0.0", 3rd Generation Partnership Project; Technical Specification Group Radio Access Network; Study on NR Industrial Internet of Things (IoT); (Release 16), Mar. 2019, 1-33.

3Gpp, "3GPP TS 38.133 V15.6.0", 3rd Generation Partnership Project; Technical Specification Group Radio Access Network; NR; Requirements for support of radio resource management (Release 15), Jun. 2019, 1-999.

Flament, Maxime, "Path towards 5G for the automotive sector", 5GAA Automotive Association presentation, Oct. 17, 2018, 1-25.

"3rd Generation Partnership Project; Technical Specification Group Services and System Aspects; System Architecture for the 5G System (5GS); Stage 2 (Release 16)", 3GPP TS 23.501 V16.2.0, Sep. 2019, 391 pages.

* cited by examiner

201. Estimating a propagation delay between a first and a second wireless device 202. Transmitting timing reference information to the second wireless device 203. Transmitting timing reference information to the first wireless device

NETWORK NODE, A FIRST WIRELESS DEVICE, A SECOND WIRELESS DEVICE AND METHODS THEREIN FOR ENABLING A TIMING REFERENCE

TECHNICAL FIELD

Embodiments herein relate to timing references or clocks in a wireless communications network. In particular, embodiments herein relate to a network node and a method therein for enabling a timing reference in a second wireless device for use in Sidelink, SL, transmissions over a SL communication link with a first wireless device. Also, embodiments herein relate to a first wireless device and a method therein for enabling a timing reference in a second wireless device for use in SL transmissions over a SL communication link with the first wireless device. Embodiments herein further relate to a second wireless device and a method therein for obtaining a timing reference for use in SL transmissions over a SL communication link with a first wireless device. Furthermore, the embodiments herein also relate to a computer program and a carrier.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations or wireless access points providing radio coverage over at least one respective geographical area forming a cell. This may be referred to as a Radio Access Network, RAN. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station in the RAN. Commonly, the wireless devices transmit data over an air or radio interface to the radio base stations in uplink, UL, transmissions and the radio base stations transmit data over an air or radio interface to the wireless devices in downlink, DL, transmissions.

In order to enable time sensitive functionalities for some wireless devices, such as, e.g. wireless devices supporting Industrial Internet-of-Things, IIoT, it is important that the timing reference, i.e. clock, used by each wireless device is synchronized with and do not differ to much from the timing reference used by the network nodes in the wireless communications network. Therefore, timing references may be distributed or relayed from a source network node in the wireless communications network, such as, e.g. a Time-Sensitive Network, TSN, node, to the wireless devices over the radio interface.

However, Radio Frequency, RF, propagation delay as well as other propagation delays in the wireless communications network may lead to a timing or clock inaccuracy in such distributed or relayed timing references, e.g. external TSN clocks. For example, a network node, such as, e.g. a gNB, may transmit a timing reference over the radio interface as a user plane payload to a wireless device (e.g. a gPTP sync message relayed by a User Plane Function, UPF, to the gNB which in turn sends it to a wireless device within a MAC Protocol Data Unit, MAC PDU). Here, the propagation delay experienced within the wireless communication network needs to be compensated for in order to ensure that the timing reference value received by the wireless device is as close as possible to the timing reference value of timing reference in a source network node, e.g. a TSN node. In some cases, there may also be a need for subsequent distribution or relaying of the received timing reference by the wireless device to other wireless devices, such as, e.g. IIoT end-devices. This may be needed to enable some TSN functionalities, such as, e.g. time-aware scheduling of IIoT device operations specific to a working domain, e.g. a specific factory area, that may be associated with a specific working timing reference.

Currently, the 3GPP Timing Advance, TA, command, as described in the standard document 3GPP TS 38.133, is utilized in wireless communications networks for time synchronization. For example, a TA command may be sent by a network node, e.g. a gNB, to a wireless device for propagation delay compensation for the link between the network node and the wireless device, and it may be applied by the wireless device for its UL communication. The TA command may be classified into two types:

Initially, at connection setup, an absolute timing parameter or TA value is communicated to a wireless device using a MAC RAR element, i.e. a MAC Random Access Response element.

After connection setup, a relative timing correction or TA value may be sent to a wireless device using a Medium Access Control, MAC, CE element. This may be performed, for example, in case timing adjustments are needed, e.g. due to movement of the wireless device or RF channel changes caused by the environment.

A DL propagation delay may be estimated for a wireless device by first summing the TA value indicated by the MAC RAR and all subsequent TA values sent using the MAC CE control element, and then using a portion of the total TA value resulting from summation of all the TA values, e.g. assuming the DL and UL propagation delays are essentially the same, 50% of the total TA value may be used. This estimated propagation delay may then be utilized by the wireless device to perform some time synchronization management. For example, the estimated propagation delay may be used by the wireless device for accurately tracking the value of a timing reference at the wireless device relative to the value of a timing reference in some other network node, e.g. a TSN node, since the delivery of that timing reference is subject to the delays it will experience as it is relayed through the wireless communications network to the wireless device.

While current TA commands may be used to identify a value for the RF portion of the overall delay experienced when distributing or relaying one or more timing references, such as, e.g. external TSN clocks, through the wireless communications network to wireless devices, it may not always be able to provide a sufficient accuracy for the timing references in subsequent wireless devices, such as, e.g. IIoT end-devices, supported by the wireless devices in the wireless communications network.

SUMMARY

It is an object of embodiments herein to improve timing references in a wireless communications network.

According to a first aspect of embodiments herein, the object is achieved by a method performed by a network node in a wireless communications network for enabling a timing reference in a second wireless device for use in Sidelink, SL, transmissions over a SL communication link with a first wireless device. The method comprises estimating a propagation delay of SL transmissions over the SL communication link between the first and second wireless device. Also, the method comprise transmitting, to the second wireless device, timing reference information based on a timing reference originating from a time reference node in a wireless communications network, and on the estimated propagation delay of SL transmissions over the SL communication link between the first and second wireless device.

According to a second aspect of embodiments herein, the object is achieved by a network node for enabling a timing reference in a second wireless device for use in SL transmissions over a SL communication link with a first wireless device. The network node comprises processing circuitry configured to estimate a propagation delay of SL transmissions over the SL communication link between the first and second wireless device. The processing circuitry is also configured to transmit, to the second wireless device, timing reference information based on a timing reference originating from a time reference node in a wireless communications network, and on the estimated propagation delay of SL transmissions over the SL communication link between the first and second wireless device.

According to a third aspect of embodiments herein, the object is achieved by a method performed by a first wireless device in a wireless communication network for enabling a timing reference in a second wireless device for use in SL transmissions over a SL communication link with the first wireless device. The method comprises obtaining information indicating that a timing reference in the second wireless device is to be updated. Also, the method comprises transmitting, to the second wireless device, timing reference information based on a timing reference originating from a time reference node in the wireless communications network, and on a propagation delay of SL transmissions over the SL communication link between the first and second wireless device.

According to a fourth aspect of embodiments herein, the object is achieved by a first wireless device in a wireless communication network for enabling a timing reference in a second wireless device for use in SL transmissions over a SL communication link with the first wireless device. The first wireless device comprises processing circuitry configured to obtain information indicating that a timing reference in the second wireless device is to be updated. The processing circuitry is also configured to transmit, to the second wireless device, timing reference information based on a timing reference originating from a time reference node in the wireless communications network, and on a propagation delay of SL transmissions over the SL communication link between the first and second wireless device.

According to a fifth aspect of embodiments herein, the object is achieved by a method performed by a second wireless device for obtaining a timing reference for use in SL transmissions over a SL communication link with a first wireless device. The method comprises receiving timing reference information based on a timing reference originating from a time reference node in a wireless communications network, and on information indicating a propagation delay of SL transmissions over the SL communication link between the first and second wireless device. Also, the method comprises obtaining a timing reference based on the received timing reference information.

According to a sixth aspect of embodiments herein, the object is achieved by a second wireless device for obtaining a timing reference for use in SL transmissions over a SL communication link with a first wireless device. The second wireless device comprises processing circuitry configured to receive timing reference information based on a timing reference originating from a time reference node in a wireless communications network, and on information indicating a propagation delay of SL transmissions over the SL communication link between the first and second wireless device. The processing circuitry is also configured to obtain a timing reference based on the received timing reference information.

According to a seventh aspect of the embodiments herein, a computer program is also provided configured to perform the method described above. Further, according to an eight aspect of the embodiments herein, carriers are also provided configured to carry the computer program configured for performing the method described above.

By taking the propagation delay of Sidelink, SL, transmissions over a SL communication link between a first and a second wireless device into consideration when providing the second wireless device with a timing reference, a more accurate timing reference may be obtained in the second wireless device. This advantageously extends the propagation delay compensation, e.g. via TA, in the wireless communications network to further address synchronization issues in SL scenarios. In fact, in case the SL distance is large, this propagation delay compensation becomes necessary for a proper operation of the second wireless device. Hence, the timing references in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figures 1, 2:
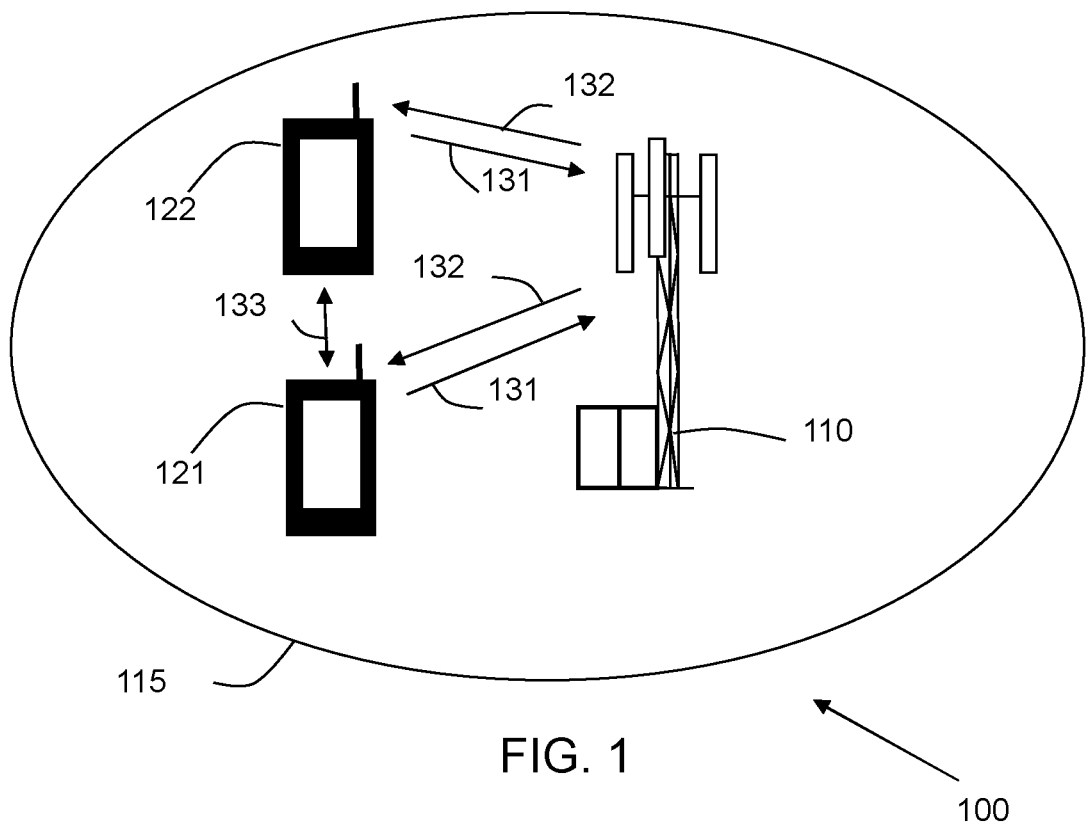
FIG. 1 is schematic illustration of a network node and a wireless device in a wireless communications network.
FIG. 2 is a flowchart depicting embodiments of methods in a network node.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless communications network 100 in which embodiments herein may operate. In some embodiments, the wireless communications network 100 may be a radio communications network, such as, 5G or NR network. Although, the wireless communications network 100 is exemplified herein as an 5G or NR network, the wireless communications network 100 may also employ technology of any one of LTE, LTE-Advanced, WCDMA, GSM/EDGE, WiMax, UMB, GSM, or any other similar network or system. The wireless communications network 100 may also employ technology of an Ultra Dense Network, UDN, which e.g. may transmit on millimetre-waves (mmW).

The wireless communications network 100 comprises a network node 110. The network node 110 may serve wireless devices in at least one cell 115, or coverage area. The network node 110 may correspond to any type of network node or radio network node capable of communicating with a wireless device and/or with another network node, such as, a base station (BS), a radio base station, gNB, eNB, eNodeB, a Home NodeB, a Home eNodeB, a femto Base Station (BS), or a pico BS in the wireless communications network 100. Further examples of the network node 110 may be a repeater, multi-standard radio (MSR) radio node such as MSR BS, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), or core network node. Although not shown in FIG. 1, the wireless communications network 100 may further comprise a Time-Sensitive Network, TSN, node supporting wireless devices with an external timing reference or clock, e.g. a TSN clock.

In FIG. 1, a first wireless device 121 and a second wireless device 122 are located within the cell 115. The first and second wireless devices 121, 122 are configured to communicate within the wireless communications network 100 via the network node 110 over a radio link served by the network node 110. Utilizing the radio link, a bi-directional communications flow may be set up between the first and second wireless devices 121, 122 and any entity capable of communication via the wireless communications network 100. The first and second wireless devices 121, 122 may transmit data over an air or radio interface to the radio base station 110 in uplink, UL, transmissions 131 and the radio base station may transmit data over an air or radio interface to the first and second wireless devices 121, 122 in downlink, DL, transmissions 132. The first and second wireless devices 121, 122 may refer to any type of wireless devices or user equipments (UEs) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication.

The first and second wireless devices 121, 122 may also be able to establish a Sidelink, SL, or device-to-device, D2D, connection or communication link 133, i.e. SL/D2D communication link, with each other in order to communicate with directly over an air radio interface. Also, the first and second wireless devices 121, 122 may, for example, together form a master-slave pair, a peer-to-peer pair, or form part of overlay or underlay SL/D2D mode. The first and second wireless devices 121, 122 may also operate the SL/D2D communication link 133 within a licensed, unlicensed or shared spectrum or any combination thereof. Further, the first and second wireless devices 121, 122 may also operate the SL/D2D communication link 133 based on different technologies, e.g. one or both may use WiFi or cellular communication. In some embodiments, the second wireless device 122 may also be a subsequent wireless devices, such as, e.g. IIoT end-device, supported by the first wireless device 121 via the SL/D2D communication link 133. For the sake of the description of the embodiments herein, it should also be noted that the first wireless device 121 may be referred to as a master UE, and the second wireless device 122 may be referred to as a slave UE. This is meant to reflect the fact the first wireless device 121 is the wireless device that manages a SL/D2D communication link 133 between the first and the second wireless device 121, 122.

As part of the developing of the embodiments described herein, it has been realized that there currently exist certain challenge(s) relating to Propagation Delay, PD, for Sidelink, SL, or other Device-to-Device, D2D, links. While the TA based PD compensation as described in the standard document 3GPP TS 38.133 may be used to address time synchronization issues in the link between the network node and the wireless device, it would also be desirable to have a PD compensation that is further extended to time-synchronization for SL or D2D communication links; in particular, considering SL or D2D-links which may extend up to distances of a hundreds of meters and handling cases where the End-to-End, E2E, clock uncertainty budget, also referred commonly as the synchronization budget, may be demanding. For example, an uncertainty budget of 1 us may be applicable for a timing reference or clock used by a slave wireless device connected through a SL/D2D communication link to a master wireless device and the source of the timing reference or clock in a TSN node.

In other words and as described by the embodiments herein, any RTT based PD compensation method may be utilized over the SL/D2D communication link to identify a value for the SL/D2D portion of the overall delay experienced when relaying one or more clocks from a clock source node (e.g. a TSN network node) to a device that is connected through a SL/D2D communication link. The knowledge of the RF portion of the overall delay (DL PD) allows UEs that have received wireless communication network clocks (via SIB or unicast RRC) to adjust them to reflect the PD delay and thereby realize close time synchronization with the network node and UPF regarding the wireless communication network system clock. This may then allow the wireless communication network clock to be used for performing ingress time stamping at the UPF and egress time stamping at the UE, thereby providing a time stamping based method for determining the overall residence time for external TSN clocks transmitted through the wireless communication network (i.e. UPF to UE) as user plane payload.

Another solution that has been proposed in this area is a SL based PD compensation method that uses a compensation value that is measured between a network node, e.g. gNB, and a primary wireless device or master UE. This SL based PD compensation method is denoted as "A" in Table 1. The non-primary UEs utilize the same compensation value due to their close physical proximity, i.e. over the SL communication with respect to primary wireless device. However, according to some embodiments herein, the PD compensation is measured over SL/D2D communication link independent of physical proximity distance restrictions. This method is denoted as "B" in Table 1.

TABLE 1

| | A | B |
|---|---|---|
| PD compensation | It is applied for gNB-UE link; no compensation is applied for D2D links | The PD compensation is applied for a given D2D link/SL. |
| D2D role | A group is defined, e.g., based on some distance threshold using D2D communication where all UEs within the group apply same gNB-UE PD compensation where the referenced UE is the master UE | |

For a smaller SL/D2D communication link distances, e.g. order of tens of meters, the compensation may not be needed. However, if the distance for the SL/D2D communication link is relatively large, e.g. in the order of hundreds of meters, then depending on End-to-End, E2E, clock uncertainty budget, propagation delay compensation for the SL/D2D communication link may become necessary.

Certain aspects of the present disclosure and their embodiments may provide solutions to these or other challenges. According to the embodiments herein, a PD compensation for a SL or D2D communication link 133 between a first and second wireless device 121, 122 is described. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Examples of embodiments of a method in a network node 110 in a wireless communications network 100 for enabling a timing reference in a second wireless device 122 for use in Sidelink, SL, transmissions over a SL communication link 133 with a first wireless device 121, will now be described with reference to the flowchart depicted in FIG. 2. FIG. 2 is an illustrated example of actions or operations which may be taken by the network node 110 in the wireless communication network 100 described and shown in FIG. 1. The method may comprise the following actions.

Action 201. The network node 110 estimates a propagation delay of SL transmissions over the SL communication link 133 between the first and second wireless device 122. In some embodiments, the network node 110 may obtain radio signal measurements from each of the first and second wireless device 122. The radio measurements may, for example, be one or more of: Angle-of-Arrival, AoA, measurements, radial distances measurements, Signal-to-Noise-Ratios, SNRs, Reference Signal Receive Powers, and RSRPs, etc. After obtaining the radio signal measurements, the network node 110 may estimate the propagation delay based on the obtained radio signal. This means that the network node 110, e.g. a gNB, may gather information, such as, e.g. Angle of Arrivals, radial distances, SNRs, etc., from both the first and second wireless device 121, 122, i.e. from both the master and slave UE. Then, the network node 110 may estimate a delay compensation for the SL or D2D communication link between the first and second wireless device 121, 122. One example, of how the network node 110 may estimate the delay compensation according to some embodiments is described below with reference to FIGS. 3 and 4. After the estimation, the network node 110 may transmit that value of the estimated delay propagation in accordance with Action 202 below, e.g. in the form of modified TA command to the second wireless device 122. Here, it should be noted that the timing reference information may also be referred to as a SL TA command or D2D TA command to indicate that it further comprises the propagation delay of the SL transmissions estimated in this Action 201, and thus differ from the standard TA command that is not configured to compensate for the propagation delay of the SL or D2D communications link between the first and second wireless device 121, 122.

In some embodiments, the network node 110 may repeat the estimation of a propagation delay and the transmission of a timing reference information upon receiving a request, from the first or second wireless device 122, for providing updated timing reference information to the second wireless device 122. Alternatively, the network node 110 may repeat the estimation of a propagation delay and the transmission of a timing reference information upon detecting a misalignment of transmitted data packets in SL transmissions over the SL communication link 133 from the second wireless device 122 at the network node 110. This means that the network node 110 may trigger a new measurements and estimations of the propagation delay for the SL or D2D communication link and initiate a new transmission of timing reference information in response to a request or misalignment detection, e.g. triggering a new subsequent SL or D2D TA command or procedure. This is advantageous since the TA value may here be sensitive to both the radio channel between the first and second wireless devices 121, 122, e.g. due to shadow fading, and the mobility of the first and second wireless devices 121, 122. For the UL connection between the network node 110 and the first wireless device 121, e.g. gNB-UE link, the network node 110 is normally static; whereas, for the SL or D2D communication link, both the first and second wireless device 121, 122 may be moving and mobile. Therefore, the timing reference information of the embodiments herein taking the propagation delay between the first and second wireless device 121, 122 into account may be more susceptible to degrading than the case of a TA value for the UL connection between the network node 110 and the first wireless device 121. Hence, in some embodiments, the network node 110 may employ multiple ways to trigger a propagation delay estimation of the SL or D2D communication link and transmission of timing reference information as described in Action 202 below. According to one example, if the control or data packet of the first wireless device 121 or the second wireless device 122 misaligns at network node 110, then the network node 110 may trigger a new TA procedure. According to another example, if the first wireless device 121 has moved, and prefers to perform the SL or D2D TA procedure before any control or data reception from the second wireless device 122, then the first wireless device 121 may ask or request that the network node 110 initiates the SL or D2D TA procedure. According to a further example, if the second wireless device 122 has moved, and prefers requesting new SL or D2D TA procedure before any control or data transmission to the first wireless device 121, then the second wireless device 122 may ask or request that the network node 110 initiates the SL or D2D TA procedure.

Action 202. After the estimation in Action 301, the network node 110 transmits, to the second wireless device 122, timing reference information based on a timing reference originating from a time reference node in a wireless communications network 100, and on the estimated propagation delay of SL transmissions over the SL communication link 133 between the first and second wireless device 122. This advantageously allows the propagation delay for the SL or D2D communication link to be compensated for in the timing reference information that is sent to the second wireless device 122. This is particularly advantageous in case the distance for the SL communication link 133, i.e. the distance between the first and second wireless devices 121, 122, is large or when supporting applications and/or services with demanding total clock uncertainty budgets.

In some embodiments, the received timing reference information may comprises an absolute or relative Timing Advance, TA, command. This means that the 3GPP Timing Advance, TA, command, as described in the standard document 3GPP TS 38.133, may be adapted to further provide the estimated propagation delay of the SL/D2D transmissions on the SL/D2D communication link. According to some embodiments, the time reference node may here be a Time-Sensitive Network, TSN, node in the wireless communications network 100.

In some embodiments, in case the second wireless device 122 is provided with an uplink timing reference for uplink transmissions to the network node 110, the network node 110 may also perform a transmission resource allocation for uplink transmissions and SL transmissions in the second wireless device 122 such that there is a minimum time resource gap between the resource allocation of the uplink transmissions and the resource allocation of the SL transmission. This may be advantageous in case, for example, a UE has more than one TA command at its disposal for UL compensation for transmission at different nodes and there is a risk that multiple UL transmission may collide, e.g. in a slot, mini-slot, or time symbol. Here, this may thus be resolved by the network node 110 by, e.g. ensuring that resource allocation between SL transmission on the SL communication link 133 and UL transmissions towards the network node 110 have minimum time resource gap G. This is exemplified in the upper part of FIG. 5 below which illustrates one example of this kind of intra-UE collision and timing adjustments that may be made.

One example of a function for determining the minimum time resource gap G is provided in Eq. 1:

$$G = \min\left(\frac{TA_{SL}}{2}, \frac{TA_{UL}}{2}\right) \quad \text{(Eq. 1)}$$

According to another example, the determining the minimum time resource gap G may be based on some other function of the TA values for the UL, $TA_{UL}$, and TA values for the SL communication link 133, i.e. $TA_{SL}$. It should also be noted that assuming different frequency resource for SL/D2D transmissions and UL transmissions, the first and/or second wireless device 121,122 have the capability to transmit both packets over the overlapping time instants.

Action 203. Optionally, the network node 110 may transmit the timing reference information to the first wireless device 121. In some cases, the timing reference information, e.g. SL TA command or D2D TA command, may only be required the second wireless device 122 to adjust its UL timing compensation when transmitting to the first wireless device 121. Therefore, the network node 110 may also consider not to transmit any the timing reference information to the first wireless device 121. Further, in some embodiments, the network node 110 may also obtain user data and forward the user data to a host computer or a wireless device.

Figure 3:
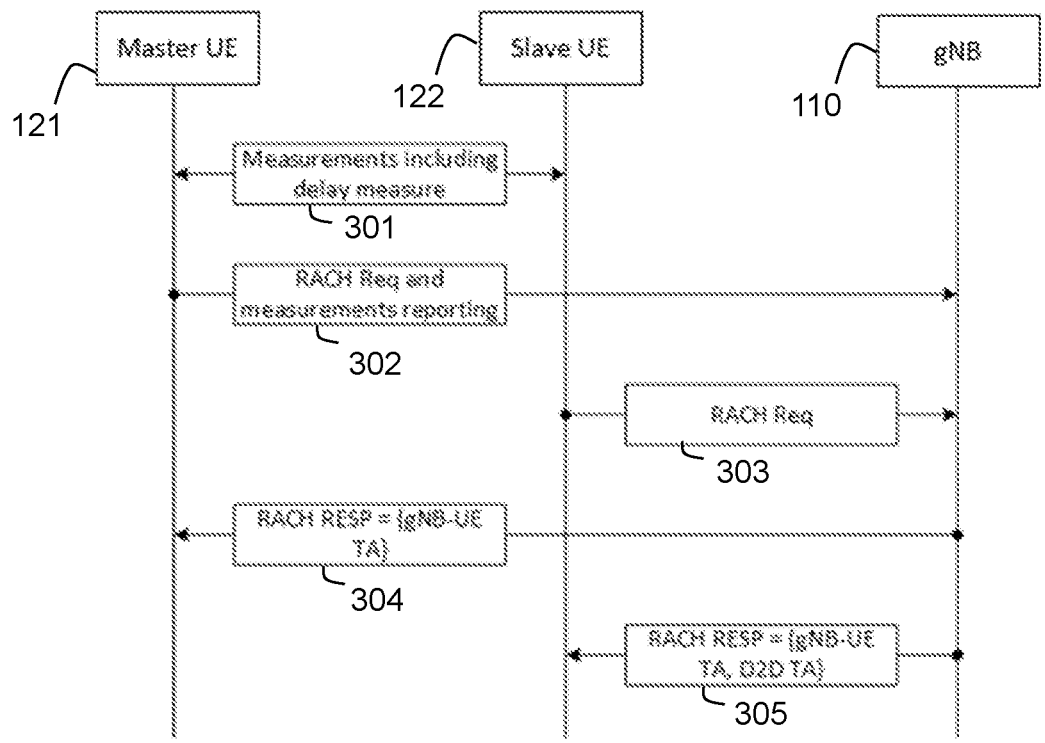
FIG. 3 is a signalling diagram depicting embodiments of methods in a network node, a first wireless device, and a second wireless device.

FIG. 3 shows a signalling diagram depicting embodiments of a method in a network node 110, a first wireless device 121, and a second wireless device 122. In particular, FIG. 3 illustrated how the network node 110 may estimate the delay compensation for a SL or D2D communication link between the first wireless device 121 and the second wireless device 122, and transmit timing reference information, e.g. SL/D2D TA command, to the first wireless device 121 and/or the second wireless device 122 taken this delay compensation into account.

In Action 301, according to some embodiments, the first and/or second wireless device 121, 122 may, e.g. before a RACH process, perform various measurements on the SL or D2D communication link, such as, e.g. SNR and/or RSRP for the link, etc.

In Action 302-303, the first and/or second wireless device 121, 122 may perform UL delay measurement towards the network node 110 and when the first and/or second wireless device 121, 122 at some point perform RACH procedure with the network node 110, either or both the first and second wireless device 121, 122 may include these measurements in one of the RACH messages or in some other RRC messages that are sent once the RACH is completed, such as, e.g. an UEInformationRequest or a UEAssistanceInformation, etc.

In Action 304-305, the network node 110 may then sends a TA command, e.g. comprising an absolute TA value, to each of the first and second wireless device 121, 122. Thus, the second wireless device 121 is also informed about how much it should adjust its UL timing when it transmits to first wireless device 121. This may, for example, be performed via RRC dedicated signalling, such as, e.g. RRCReconfiguration. Here, in order to transmit the SL/D2D TA command comprising the SL/D2D delay compensation information to the second wireless device 121, the network node 110 may, in some embodiments, include both TAs in a RACH response message, as shown and exemplified in FIG. 3. Optionally, in some embodiments, the network node 110 may communicate the SL/D2D TA command in RRC dedicated signalling.

Figure 4:
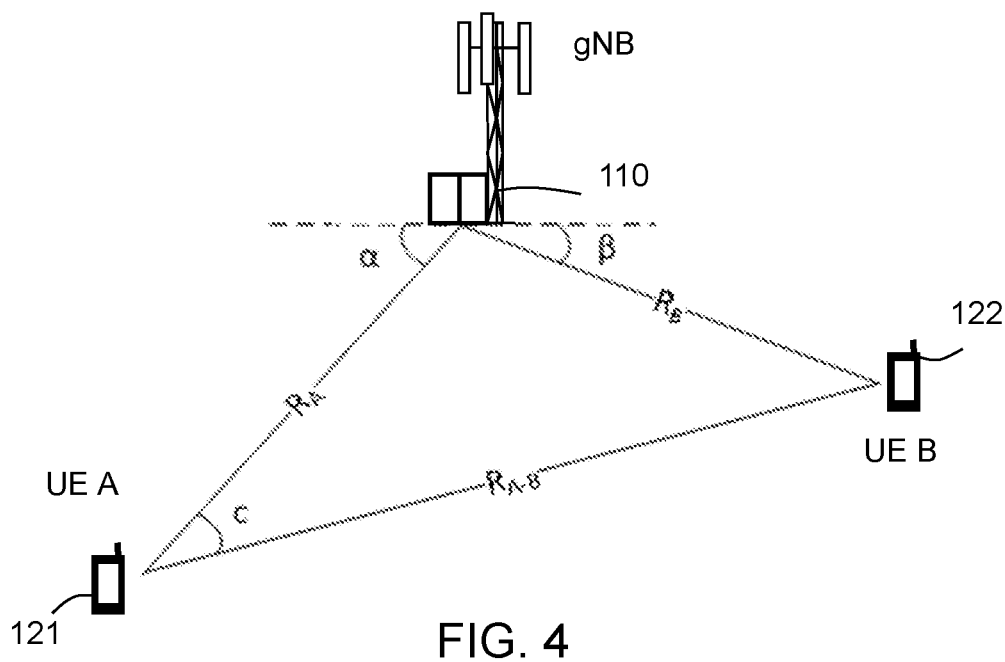
FIG. 4 is a schematic illustration of a wireless communications network in accordance with some embodiments.

FIG. 4 illustrates an example of how the network node 110 may estimate the distance for the SL/D2D communication link between the first wireless device 121 and the second wireless device 122, i.e. the distance $R_{A-B}$. Here, the network node 110 may estimate the distance RA-B using known gNB-UE distances $R_A$, $R_B$, and their angle of arrivals $\alpha$, $\beta$ according to Eq. 2:

$$\frac{R_{A-B}}{\sin(180 - \alpha - \beta)} = \frac{R_B}{\sin c} = \frac{R_A}{\sin(180 + \alpha + \beta - c)} \quad \text{(Eq. 2)}$$

Figure 5:
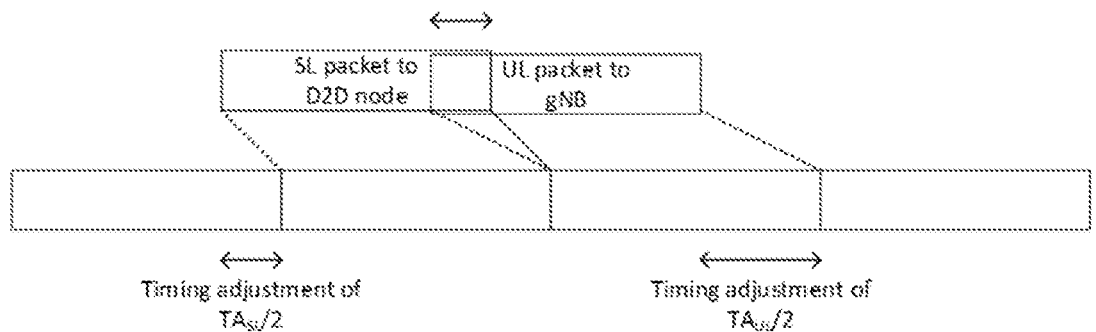
FIG. 5 is a schematic illustration of an example of transmission collision in a first wireless device.

FIG. 5 illustrates an intra-UE collision of transmissions for the first wireless device 121 on the UL 131 towards the network node and on the SL/D2D communication link 133 toward the second network node 122. FIG. 5 also illustrates the timing adjustments that may be made by, for example, the network node 110.

Figure 6:
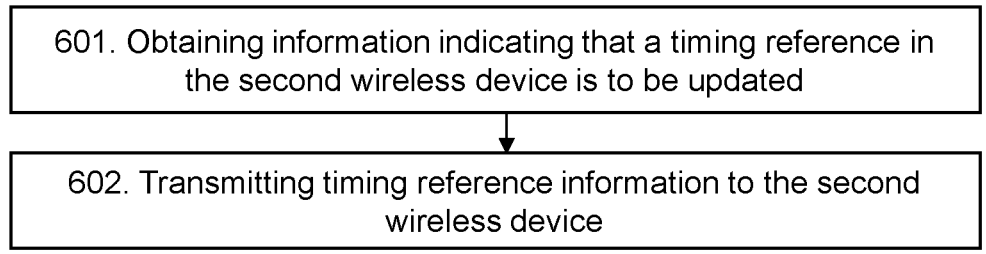
FIG. 6 is a flowchart depicting embodiments of methods in a first wireless device.

Examples of embodiments of a method performed by a first wireless device 121 in a wireless communication network for enabling a timing reference in a second wireless device 122 for use in Sidelink, SL, transmissions over a SL communication link 133 with the first wireless device 121, will now be described with reference to the flowchart depicted in FIG. 6. FIG. 6 is an illustrated example of actions or operations which may be taken by the first wireless device 121 in the wireless communication network 100 described and shown in FIG. 1. The method may comprise the following actions.

Action 601. The first wireless device 121 obtains information indicating that a timing reference in the second wireless device 122 is to be updated. In some embodiments, the obtained information may indicate that no timing reference exists in the second wireless device 122. Also, in some embodiments, the obtained information may indicate that a periodicity timer associated with a timing reference for the second wireless device 122 has expired. Further, in some embodiments, the obtained information may indicate that the timing reference in the second wireless device 122 is no longer accurate. Furthermore, in some embodiments, the obtained information may indicate that a movement of the first and/or second wireless device 122 that exceeds one or more distance threshold values has been registered. This means that the first wireless device 121 may be triggered to transmit new timing reference information to the second wireless device 122, as described in Action 602 below, in case for example, a TA command has not been sent previously (e.g. during initialization of the second wireless device 122), a TA periodicity timer has been expired which means the second wireless device 122 needs to refresh its reference time, or the second wireless device 122 has lost or corrupted the timing compensation value. In the latter case, the second wireless device 122 may request the timing compensation, but if the first wireless device 121 notice that the second wireless device 122 has a bad delay compensation value, the first wireless device 121 may transmit a new timing reference information, e.g. including a new propagation delay compensation value, to the second wireless device 122.

Action 602. After obtaining the information in Action 601, the first wireless device 121 transmits to the second wireless device 122, timing reference information based on a timing reference originating from a time reference node in the wireless communications network 100, and on a propagation delay of SL transmissions over the SL communication link 133 between the first and second wireless device 122. This advantageously allows the propagation delay for the SL or D2D communication link to be compensated for in the timing reference information that is sent to the second wireless device 122. This is particularly advantageous in case the distance for the SL communication link 133, i.e. the distance between the first and second wireless devices 121, 122, is large or when supporting applications and/or services with demanding total clock uncertainty budgets. The timing reference information may, for example, be transmitted over a SL/D2D control or data channel.

According to some embodiments, the first wireless device 121 may obtain the propagation delay of SL transmissions over the SL communication link 133 between the first and second wireless device 122 by performing a Timing Advance, TA, procedure or a Round-Trip-Time, RTT, measurement procedure towards the second wireless device 122. Here, it should be noted that the way in which the first wireless device 121, i.e. the master UE, acquires TA information applicable to the second wireless device 122, i.e. the slave UE, may be the same as the method used by network node 110 to acquire TA information applicable to the first wireless device 121, i.e. the master UE. According to some embodiments, the first wireless device 121 may repeat the obtaining of a propagation delay and the transmission of a timing reference information when a misalignment of transmitted data packets in SL transmissions over the SL communication link 133 from the second wireless device 122 has been detected. This means that if the control or data packet of the second wireless device 122 misaligns at the first wireless device 121, then the first wireless device 121 may trigger a TA procedure.

In some embodiments, in case the first wireless device 121 is provided with an uplink timing reference for uplink transmissions to a network node 110 in a wireless communications network 100, the second wireless device 121 may prioritize at least one of an uplink transmission or a SL transmission in case the uplink timing reference and timing reference for the SL transmissions cause the uplink transmission and SL transmission to overlap in time. Alternatively, the first wireless device 121 may transmit an uplink transmission and a SL transmission on different transmission frequency resources in case the uplink timing reference and timing reference for the SL transmissions cause the uplink transmission and SL transmission to overlap in time. According to another option, the first wireless device 121 may transmit a non-prioritized SL transmission without using the timing reference for the SL transmissions in case the uplink timing reference and timing reference for the SL transmissions cause the uplink transmission and the SL transmission to overlap in time. The above mentioned alternatives or options means may be advantageous in case, for example, a UE has more than one TA command at its disposal for UL compensation for transmission at different nodes and there is a risk that multiple UL transmission may collide, e.g. in a slot, mini-slot, or time symbol. Here, this may thus be resolved or resolute by the first wireless device 121 by, e.g. prioritize transmissions, postpone or drop non-prioritize transmissions, or transmit, e.g., non-priority transmissions without implementing TA command.

In some embodiments, the transmitted timing reference information may comprise an absolute or relative Timing Advance, TA, command. This means that the 3GPP Timing Advance, TA, command, as described in the standard document 3GPP TS 38.133, may be adapted to further provide the estimated propagation delay of the SL/D2D transmissions on the SL/D2D communication link. According to some embodiments, the time reference node may here be a Time-Sensitive Network, TSN, node in the wireless communications network 100. Optionally, in some embodiments, the first wireless device 121 may provide user data, and forward the user data to a host computer via the transmission to the network node 110.

Figure 7:
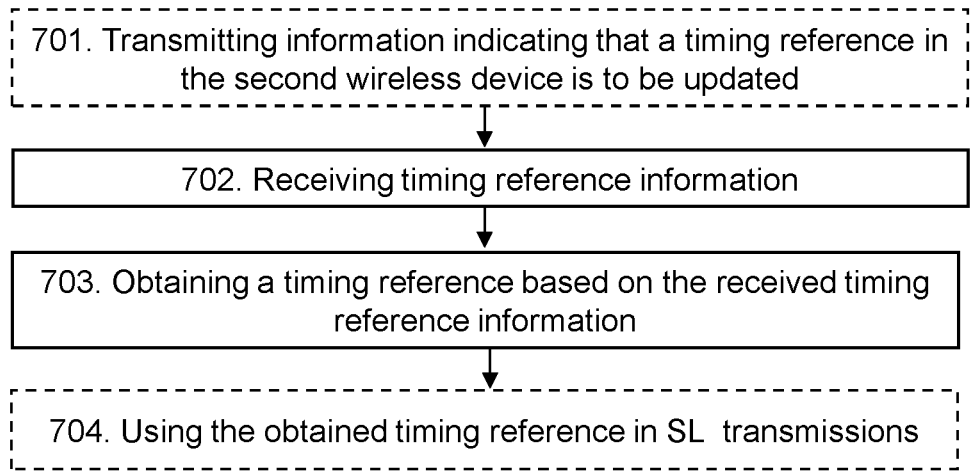
FIG. 7 is a flowchart depicting embodiments of methods in a second wireless device.

Examples of embodiments of a method performed by a second wireless device 122 for obtaining a timing reference for use in Sidelink, SL, transmissions over a SL communication link 133 with a first wireless device 121, will now be described with reference to the flowchart depicted in FIG. 7. FIG. 7 is an illustrated example of actions or operations which may be taken by the second wireless device 122 in the wireless communication network 100 described and shown in FIG. 1. The method may comprise the following actions.

Action 701. Optionally, the second wireless device 122 may first transmit, to the first wireless device 121 or a network node 110 in the wireless communications network 100, information indicating that a timing reference in the second wireless device 122 is to be updated. In some embodiments, the transmitted information may indicate that no timing reference exists in the second wireless device 122. Alternatively, in some embodiments, the transmitted information may indicate that a periodicity timer associated with a timing reference for the second wireless device 122 has expired. Optionally, in some embodiments, the transmitted information may indicate that the timing reference in the second wireless device 122 is no longer accurate. According to another option, in some embodiments, the transmitted information may indicate that a movement of the first and/or second wireless device 122 that exceeds one or more distance threshold values has been registered.

Action 702. The second wireless device 122 receives timing reference information based on a timing reference originating from a time reference node in a wireless communications network 100, and on information indicating a propagation delay of SL transmissions over the SL communication link 133 between the first and second wireless device 122. In some embodiments, the information indicating a propagation delay may be a propagation delay of SL transmissions over the SL communication link 133 between the first and second wireless device 122 received from the first wireless device 121. Optionally, in some embodiments, the information indicating a propagation delay may be an estimated propagation delay of SL transmissions over the SL communication link 133 between the first and second wireless device 122 received from a network node 110 in the wireless communications network 100. The latter may be received via the first wireless device 121.

Action 703. After reception in Action 702, the second wireless device 122 obtains a timing reference based on the received timing reference information. This means that the second wireless device 122 may use the value of the external timing reference or clock acquired from the first wireless device 121 plus the SL/D2D TA information also acquired from the first wireless device 121 to adjust the external clock, and thereby realize an external timing reference or clock value that is closely synchronized with the timing reference or clock value of a timing reference or clock at a source node, such as, e.g. a TSN node in the wireless communications network 100.

Action 704. After the obtaining in Action 703, the second wireless device 122 may use the obtained timing reference in SL transmissions over the SL communication link 133 between the first and second wireless device 122. In some embodiments, in case the second wireless device 122 is provided with an uplink timing reference for uplink transmissions to a network node 110 in a wireless communications network 100, the second wireless device 122 may prioritize at least one of an uplink transmission or a SL transmission in case the uplink timing reference and timing reference for the SL transmissions cause the uplink transmission and SL transmission to overlap in time. Alternatively, the second wireless device 122 may transmit an uplink transmission and a SL transmission on different transmission frequency resources in case the uplink timing reference and timing reference for the SL transmissions cause the uplink transmission and SL transmission to overlap in time. According to another option, the second wireless device 122 may transmit a non-prioritized SL transmission without using the timing reference for the SL transmissions in case the uplink timing reference and timing reference for the SL transmissions cause the uplink transmission and the SL transmission to overlap in time. The above mentioned alternatives or options means may be advantageous in case, for example, a UE has more than one TA command at its disposal for UL compensation for transmission at different nodes and there is a risk that multiple UL transmission may collide, e.g. in a slot, mini-slot, or time symbol. Here, this may thus be resolved or resolute by the second wireless device 122 by, e.g. prioritize transmissions, postpone or drop non-prioritize transmissions, or transmit, e.g., non-priority transmissions without implementing TA command.

In some embodiments, the received timing reference information may comprise an absolute or relative Timing Advance, TA, command. This means that the 3GPP Timing Advance, TA, command, as described in the standard document 3GPP TS 38.133, may be adapted to further provide the estimated propagation delay of the SL/D2D transmissions on the SL/D2D communication link. According to some embodiments, the time reference node may here be a Time-Sensitive Network, TSN, node in the wireless communications network 100. Optionally, in some embodiments, the second wireless device 122 may provide user data, and forward the user data to a host computer via the transmission to the network node 110.

Figure 8:
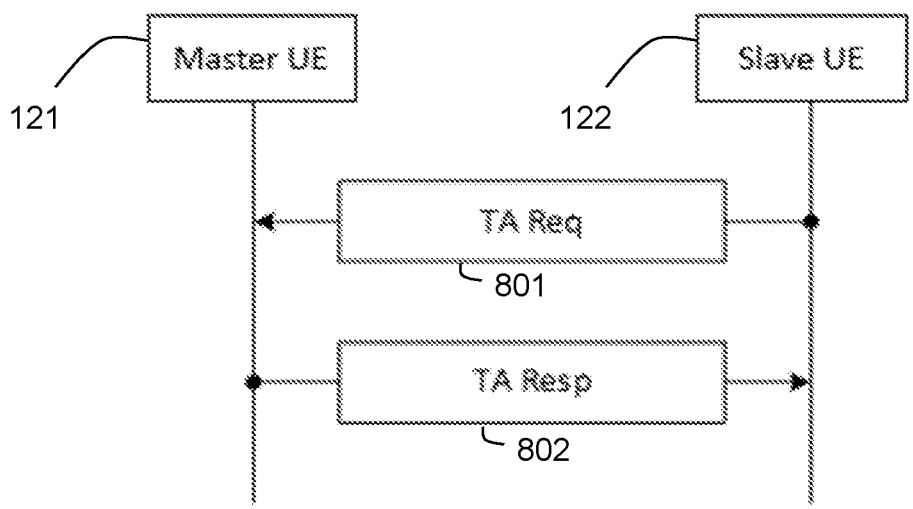
FIG. 8 is a signalling diagram depicting embodiments of methods in a first wireless device and a second wireless device.

FIG. 8 shows a signalling diagram depicting embodiments of methods in a first wireless device 121 and a second wireless device 122. In particular, FIG. 8 illustrates how the first wireless device 121 receive a request for timing reference information from the second wireless device 122, and transmit timing reference information, e.g. SL/D2D TA command, to the second wireless device 122 taking a propagation delay compensation for the SL or D2D communication link between the first wireless device 121 and the second wireless device 122 into account. Here, it should be noted that, for the SL/D2D communication link between the first and second wireless device 121, 122, a wireless device, e.g. the first wireless device 121, may be chosen as reference UE, e.g. through random or optimized UE selection, to be responsible for transmission of TA commands to other UEs, e.g. the second wireless device 122, over the SL/D2D communication link in order to compensate timing differences between the reference UE and other UEs due to propagation delay on the SL/D2D communication link. Thus, the first wireless device 121 may be referred to as a master UE, and the second wireless device 122 may be referred to as a slave UE.

In Action 801, the first wireless device 121 may, according to some embodiments, receive a TA request message from the second wireless device 122. This means that the second wireless device 122 may indicated to the first wireless device 121 that it requires a new timing reference information. In other words, a request for an SL/D2D TA command may be communicated by a slave UE to a master UE.

In Action 802, according to some embodiments and in response to the TA request in Action 801, the first wireless device 121 may transmit a TA response message to the second wireless device 122. This means that the first wireless device 121 may estimate, e.g. via triggering a TA procedures, and transmit a new timing reference information to the second wireless device 122. In other words, an SL/D2D TA command may be communicated by a master UE to a slave UE. This ensures that the second wireless device 122, i.e. the slave UE, has a current value for the external clock for which the first wireless device 121, i.e. the master UE, is serving as a local master. In this case, this means that the second wireless device 122, i.e. the slave UE, does not acquire the external clock via communication with the network node 110.

According to some embodiments, the first wireless device 121, i.e. the master UE, may receive an absolute (initial) TA command. This may, for example, occur in case of the communication link between the network node 110 and the first wireless device 121, e.g. gNB-UE link, enters a RRC connected state, i.e. the TA command in here sent in RACH response message by network node 110. The first wireless device 121 may then acquire additional timing information that is relative to the absolute TA information, such that the first wireless device 121 may continually maintain a current value for the DL delay compensation applicable to its serving network node 110. According to some embodiments, the relative timing information provides timing information that adds on to or subtracts from timing information provided by previous TA commands, i.e. sum of an absolute TA and all subsequent relative TA commands. This may allow it to accurately maintain a 5G system clock, which may also be available at the network node 110 and perhaps by a User Plane Function, UPF. This allows the first wireless device 121 to use time stamping in order to measure the time it takes for an external timing reference or clock to, e.g. migrate from the UPF to the first wireless device 121. The first wireless device 121 is therefore enabled to acquire and accurately maintain an external timing reference or clock, which further enables it to serve as local master wherein it delivers the external timing references or clocks to slave UEs, such as, e.g. the second wireless device 122.

Figure 9:
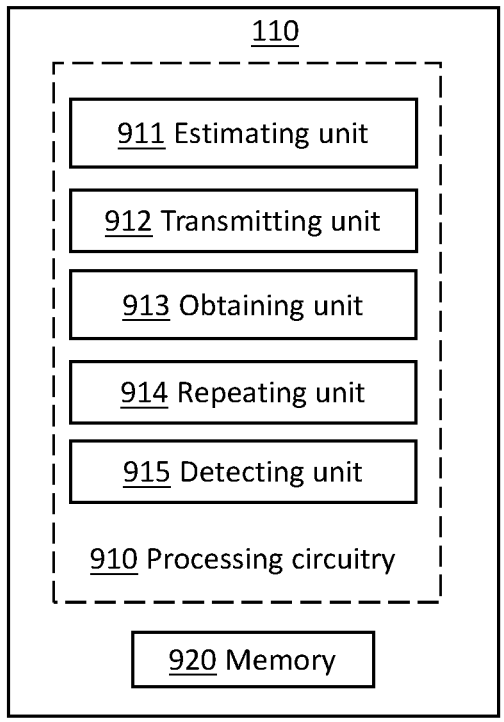
FIG. 9 is a block diagram depicting embodiments of a network node.

To perform the method actions in a network node 110 for enabling a timing reference in a second wireless device 122 for use in SL transmissions 133 over a SL communication link 133 with a first wireless device 121, the network node 110 may comprise the following arrangement depicted in FIG. 9. FIG. 9 shows a schematic block diagram of embodiments of a virtual apparatus 910 that may be implemented in network node 110.

Figure 12:
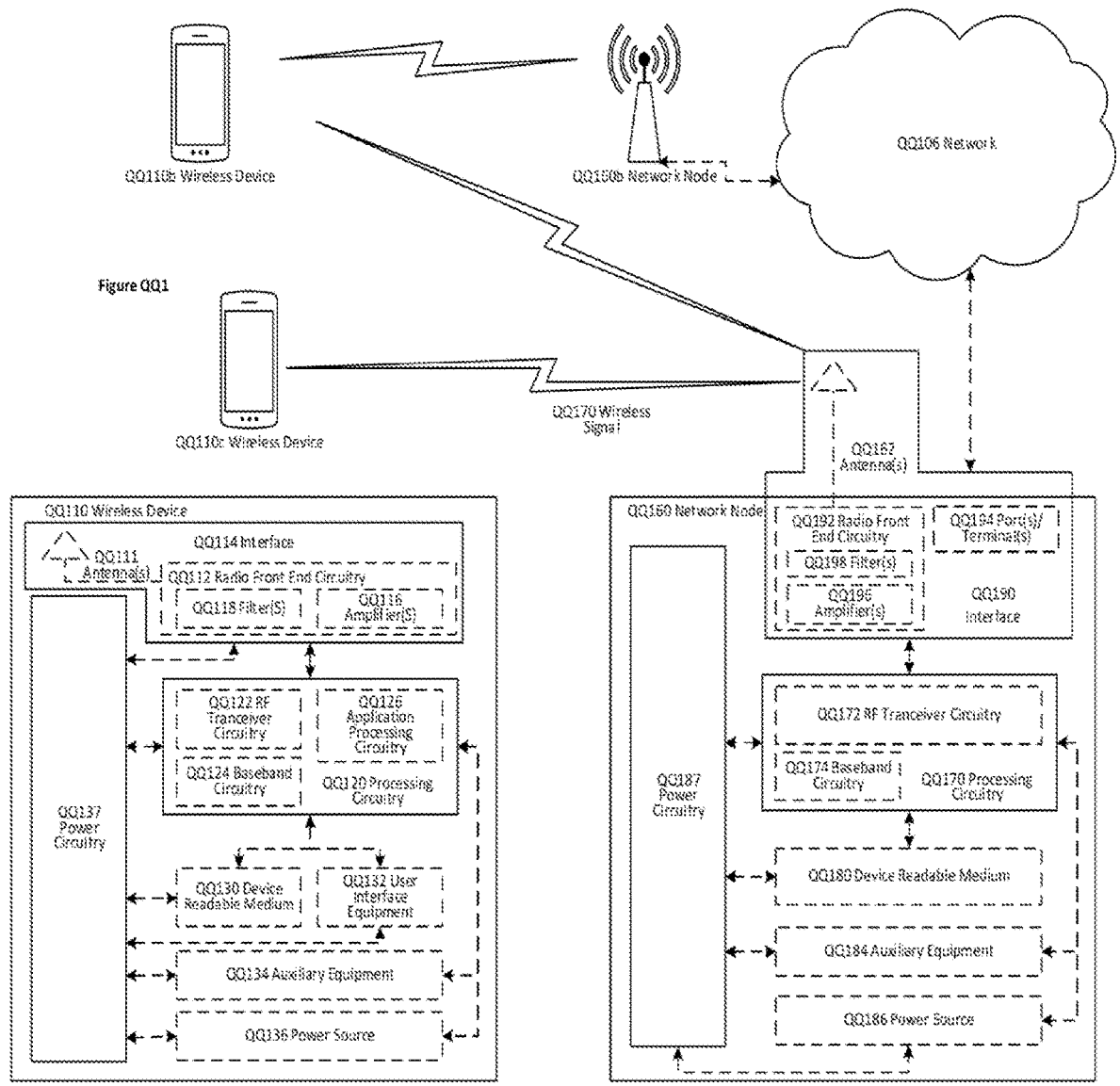
FIG. 12 is a schematic illustration of a wireless network in accordance with some embodiments.

FIG. 9 illustrates a schematic block diagram of embodiments of an apparatus 510 in a wireless communications network 100 (for example, the wireless network shown in FIG. 1 or FIG. 12). The apparatus 910 may be implemented in a base station or network node 110 (e.g. the network node QQ160 shown in FIG. 12). Apparatus 910 is operable to carry out the example method described with reference to FIG. 2, and possibly any other processes or methods disclosed herein. It is also to be understood that the method of FIG. 2 is not necessarily carried out solely by apparatus 910. At least some operations of the method can be performed by one or more other entities.

Apparatus 910, also referred to as a virtual apparatus implemented in a base station, may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a estimating unit 911, a transmitting unit 912, an obtaining unit 913, a repeating unit 914 and a detecting unit 915, and any other suitable units of apparatus 910 to perform corresponding functions according one or more embodiments of the present disclosure.

The network node 110 or processing circuitry therein is configured to, or may comprise the estimating unit 911 configured to, estimate a propagation delay of SL transmissions over the SL communication link 133 between the first and second wireless device 122. Also, the base station 110 or processing circuitry therein is configured to, or may comprise the incrementing unit 511 configured to, transmit, to the second wireless device 122, timing reference information based on a timing reference originating from a time reference node in a wireless communications network 100 and on the estimated propagation delay of SL transmissions over the SL communication link 133 between the first and second wireless device 122. In some embodiments, the received timing reference information may comprise an absolute or relative Timing Advance, TA, command.

In some embodiments, the network 110 or processing circuitry therein may be configured to, or may comprise an obtaining unit 913 configured to, obtain radio signal measurements from each of the first and second wireless device 122, wherein the radio signal measurements is one or more of: Angle-of-Arrival, AoA, measurements, radial distances measurements, Signal-to-Noise-Ratios, SNRs, Reference Signal Receive Powers, and RSRPs. In this case, the network 110 or processing circuitry therein may be configured to, or may comprise the estimating unit 911 configured to, estimate the propagation delay based on the obtained radio signal measurements.

In some embodiments, the network node 110 or processing circuitry therein may be configured to, or may comprise the repeating unit 914 configured to, repeat the estimation of a propagation delay and the transmission of a timing reference information upon receiving a request, from the first or second wireless device 122, for providing updated timing reference information to the second wireless device 122.

Alternatively, the network node 110 or processing circuitry therein may be configured to, or may comprise the detecting unit 915 configured to, detect a misalignment of transmitted data packets in SL transmissions over the SL communication link 133 from the second wireless device 122 at the network node 110.

In some embodiments, the network node 110 or processing circuitry therein may be configured to, or may comprise the transmitting unit 912 configured to, perform, in case the second wireless device 122 is provided with an uplink timing reference for uplink transmissions to the network node 110, perform a transmission resource allocation for uplink transmissions and SL transmissions in the second wireless device 122 such that there is a minimum time resource gap between the resource allocation of the uplink transmissions and the resource allocation of the SL transmission. In some embodiments, the network node 110 or processing circuitry therein may be configured to, or may comprise the transmitting unit 912 configured to, transmit the timing reference information to the first wireless device 121. In some embodiments, the time reference node is a Time-Sensitive Network, TSN, node in the wireless communications network 100. In some embodiments, the network node 110 may comprise a power supply circuitry configured to supply power to the network node 110.

Figure 10:
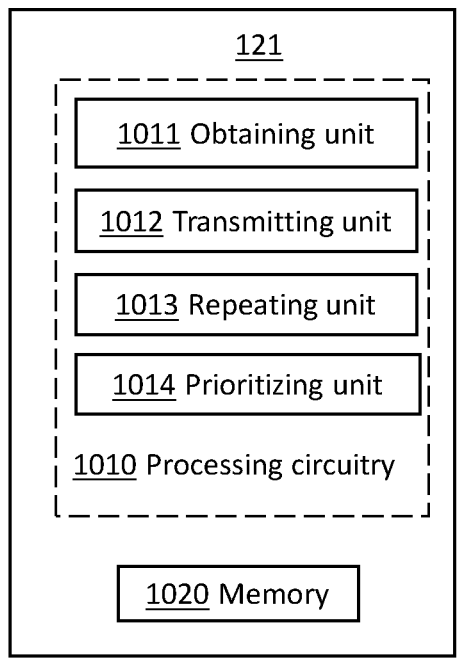
FIG. 10 is a block diagram depicting embodiments of a first wireless device.

To perform the method actions in a first wireless device 121 in a wireless communication network for enabling a timing reference in a second wireless device 122 for use in Sidelink, SL, transmissions over a SL communication link 133 with the first wireless device 121, the first wireless device 121 may comprise the following arrangement depicted in FIG. 10. FIG. 10 shows a schematic block diagram of embodiments of a virtual apparatus 1010 that may be implemented in the first wireless device 121.

FIG. 10 illustrates a schematic block diagram of embodiments of an apparatus 1010 in a wireless communications network 100 (for example, the wireless network shown in FIG. 1 or FIG. 12). The apparatus 1010 may be implemented in a wireless device 121 (e.g. the wireless device QQ110 shown in FIG. 12). Apparatus 1010 is operable to carry out the example method described with reference to FIG. 6, and possibly any other processes or methods disclosed herein. It is also to be understood that the method of FIG. 6 is not necessarily carried out solely by apparatus 1010. At least some operations of the method can be performed by one or more other entities.

Apparatus 1010, also referred to as a virtual apparatus implemented in a base station, may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause an obtaining unit 1011, a transmitting unit 1012, a repeating unit 1013, and a prioritizing unit 1014, and any other suitable units of apparatus 1010 to perform corresponding functions according one or more embodiments of the present disclosure.

The first wireless device 121 or processing circuitry therein is configured to, or may comprise the obtaining unit 1011 configured to, obtain information indicating that a timing reference in the second wireless device 122 is to be updated. Also, the first wireless device 121 or processing circuitry therein is configured to, or may comprise the transmitting unit 1012 configured to, transmit, to the second wireless device 122, timing reference information based on a timing reference originating from a time reference node in the wireless communications network 100, and on a propagation delay of SL transmissions over the SL communication link 133 between the first and second wireless device 122. In some embodiments, the obtained information may indicate that no timing reference exists in the second wireless device 122, that a periodicity timer associated with a timing reference for the second wireless device 122 has expired, that the timing reference in the second wireless device 122 is no longer accurate, or that a movement of the first and/or second wireless device 122 that exceeds one or more distance threshold values has been registered. In some embodiments, the transmitted timing reference information comprises an absolute or relative Timing Advance, TA, command.

In some embodiments, the first wireless device 121 or processing circuitry therein may be configured to, or may comprise the obtaining unit 1011 configured to, obtain the propagation delay of SL transmissions over the SL communication link 133 between the first and second wireless device 122 by performing a Timing Advance, TA, procedure or a Round-Trip-Time, RTT, measurement procedure towards the second wireless device 122. In some embodiments, the first wireless device 121 or processing circuitry therein may be configured to, or may comprise the repeating unit 1013 configured to, repeat the obtaining of a propagation delay and the transmission of a timing reference information when a misalignment of transmitted data packets in SL transmissions over the SL communication link 133 from the second wireless device 122 has been detected.

Further, in some embodiments, in case the first wireless device 121 is provided with an uplink timing reference for uplink transmissions to a network node 110 in a wireless communications network 100, the second wireless device 121 or processing circuitry therein is configured to, or may comprise the prioritizing unit 1014 configured to, prioritize at least one of an uplink transmission or a SL transmission in case the uplink timing reference and timing reference for the SL transmissions cause the uplink transmission and SL transmission to overlap in time. Here, in some embodiments, the second wireless device 122 or processing circuitry therein may be configured to, or may comprise the transmitting unit 1012 configured to, transmit an uplink transmission and a SL transmission on different transmission frequency resources in case the uplink timing reference and timing reference for the SL transmissions cause the uplink transmission and SL transmission to overlap in time. Also, the second wireless device 122 or processing circuitry therein may be configured to, or may comprise the transmitting unit 1012 configured to, transmit a non-prioritized SL transmission without using the timing reference for the SL transmissions in case the uplink timing reference and timing reference for the SL transmissions cause the uplink transmission and the SL transmission to overlap in time. In some embodiments, the time reference node is a Time-Sensitive Network, TSN, node in the wireless communications network 100. In some embodiments, the first wireless device 121 may comprise a power supply circuitry configured to supply power to the first wireless device 121.

Figure 11:
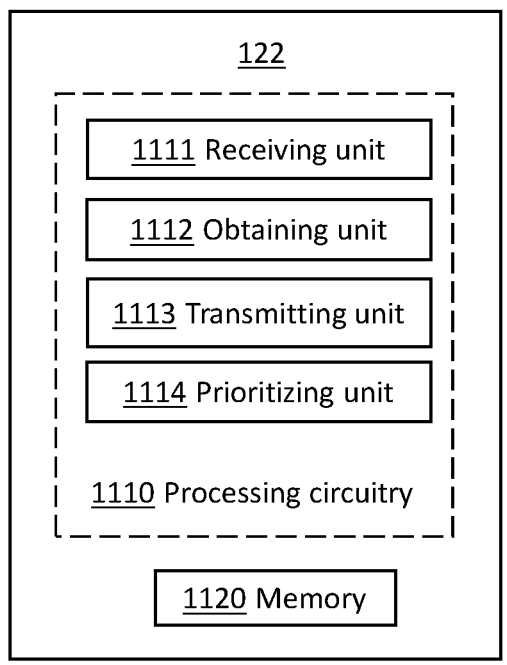
FIG. 11 is a block diagram depicting embodiments of a second wireless device.

To perform the method actions in a second wireless device 121 for obtaining a timing reference for use in SL transmissions 133 over a SL communication link 133 with a first wireless device 121, the second wireless device 122 may comprise the following arrangement depicted in FIG. 11. FIG. 11 shows a schematic block diagram of embodiments of a virtual apparatus 1110 that may be implemented in the second wireless device 122.

FIG. 11 illustrates a schematic block diagram of embodiments of an apparatus 1110 in a wireless communications network 100 (for example, the wireless network shown in FIG. 1 or FIG. 12). The apparatus 1110 may be implemented in a wireless device 122 (e.g. the wireless device QQ110 shown in FIG. 12). Apparatus 1110 is operable to carry out the example method described with reference to FIG. 8, and possibly any other processes or methods disclosed herein. It is also to be understood that the method of FIG. 8 is not necessarily carried out solely by apparatus 1110. At least some operations of the method can be performed by one or more other entities.

Apparatus 1110, also referred to as a virtual apparatus implemented in a base station, may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause an receiving unit 1111, a obtaining unit 1112, a transmitting unit 1113, and a prioritizing unit 1114, and any other suitable units of apparatus 1110 to perform corresponding functions according one or more embodiments of the present disclosure.

The second wireless device 122 or processing circuitry therein is configured to, or may comprise the receiving unit 1111 configured to, receive timing reference information based on a timing reference originating from a time reference node in a wireless communications network 100, and on information indicating a propagation delay of SL transmissions over the SL communication link 133 between the first and second wireless device 122. Also, the second wireless device 121 or processing circuitry therein is configured to, or may comprise the obtaining unit 1112 configured to, obtain a timing reference based on the received timing reference information.

In some embodiments, the information indicating a propagation delay is a propagation delay of SL transmissions over the SL communication link 133 between the first and second wireless device 122 received from the first wireless device 121, or an estimated propagation delay of SL transmissions over the SL communication link 133 between the first and second wireless device 122 received from a network node 110 in the wireless communications network 100. In some embodiments, the received timing reference information comprises an absolute or relative Timing Advance, TA, command.

In some embodiments, the second wireless device 122 or processing circuitry therein may be configured to, or may comprise the transmitting unit 1113 configured to, use the obtained timing reference in SL transmissions over the SL communication link 133 between the first and second wireless device 122. In some embodiments, the second wireless device 122 or processing circuitry therein may be configured to, or may comprise the transmitting unit 1113 configured to, transmit, to the first wireless device 121 or a network node 110 in the wireless communications network 100, information indicating that a timing reference in the second wireless device 122 is to be updated. Here, in some embodiments, the transmitted information indicate that no timing reference exists in the second wireless device 122, that a periodicity timer associated with a timing reference for the second wireless device 122 has expired, that the timing reference in the second wireless device 122 is no longer accurate, or that a movement of the second wireless device 122 that exceeds a distance threshold value has been registered.

Further, in some embodiments, in case the second wireless device 122 is provided with an uplink timing reference for uplink transmissions to a network node 110 in a wireless communications network 100, the second wireless device 121 or processing circuitry therein is configured to, or may comprise the prioritizing unit 1114 configured to, prioritize at least one of an uplink transmission or a SL transmission in case the uplink timing reference and timing reference for the SL transmissions cause the uplink transmission and SL transmission to overlap in time. Here, in some embodiments, the second wireless device 122 or processing circuitry therein may be configured to, or may comprise the transmitting unit 1113 configured to, transmit an uplink transmission and a SL transmission on different transmission frequency resources in case the uplink timing reference and timing reference for the SL transmissions cause the uplink transmission and SL transmission to overlap in time. Also, the second wireless device 122 or processing circuitry therein may be configured to, or may comprise the transmitting unit 1113 configured to, transmit a non-prioritized SL transmission without using the timing reference for the SL transmissions in case the uplink timing reference and timing reference for the SL transmissions cause the uplink transmission and the SL transmission to overlap in time. In some embodiments, the time reference node is a Time-Sensitive Network, TSN, node in the wireless communications network 100. In some embodiments, the second wireless device 123 may comprise a power supply circuitry configured to supply power to the second wireless device 122.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware. The term unit may also have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
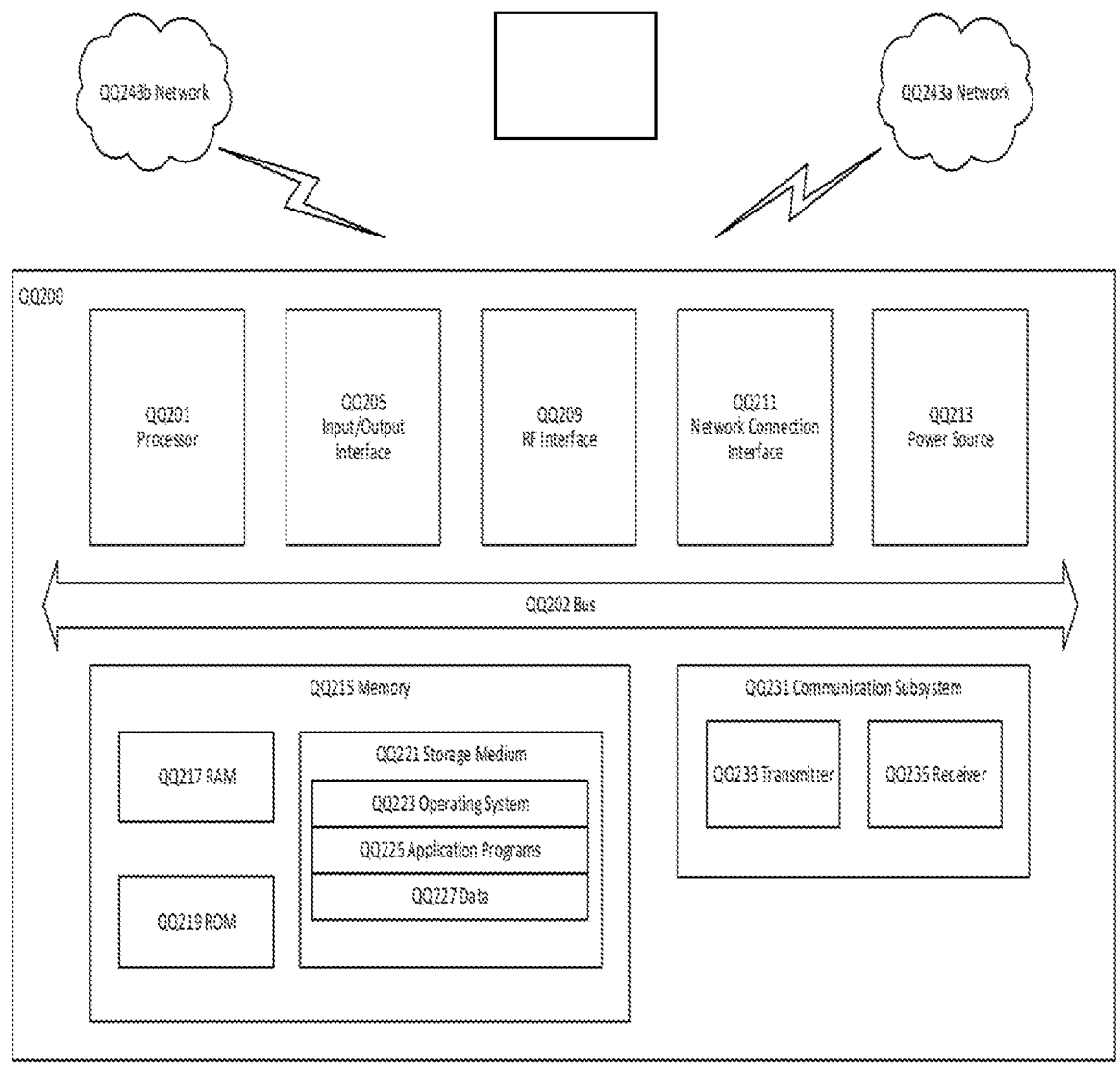
FIG. 13 is a schematic illustration of a user equipment.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately. RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200. The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein.

Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
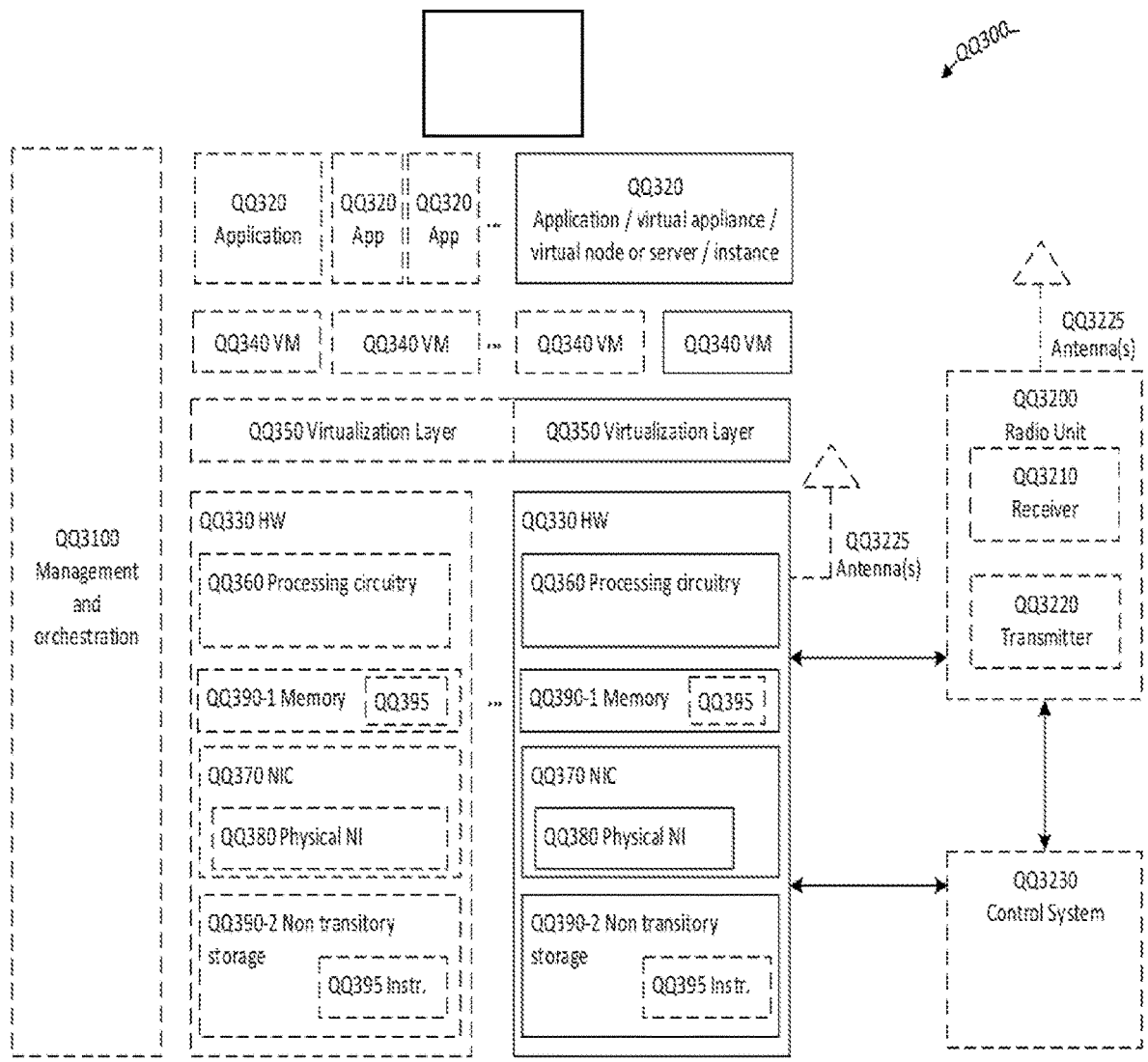
FIG. 14 is a schematic illustration of a virtualization environment in accordance with some embodiments, FIG. 15 schematically illustrates a telecommunication network connected via an intermediate network to a host computer.

FIG. 14 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in Figure QQ3. In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station. In some embodiments, some signalling can be effected with the use of control system QQ3230 which may alternatively be used for communication between the hardware nodes QQ330 and radio units QQ3200.

Figure 15:
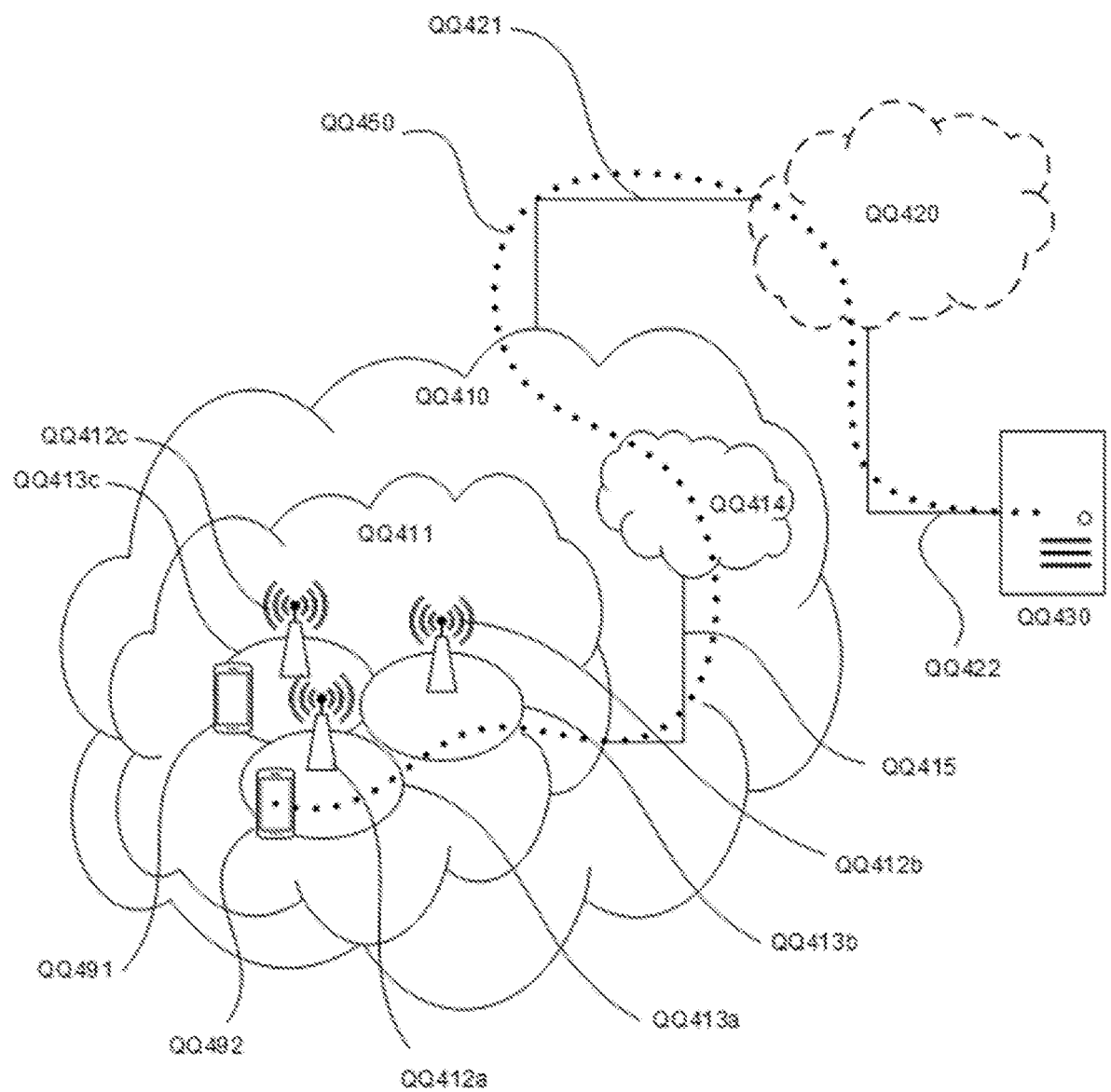

With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 16. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides. It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 and independently, the surrounding network topology may be that of FIG. 15.

Figure 16:
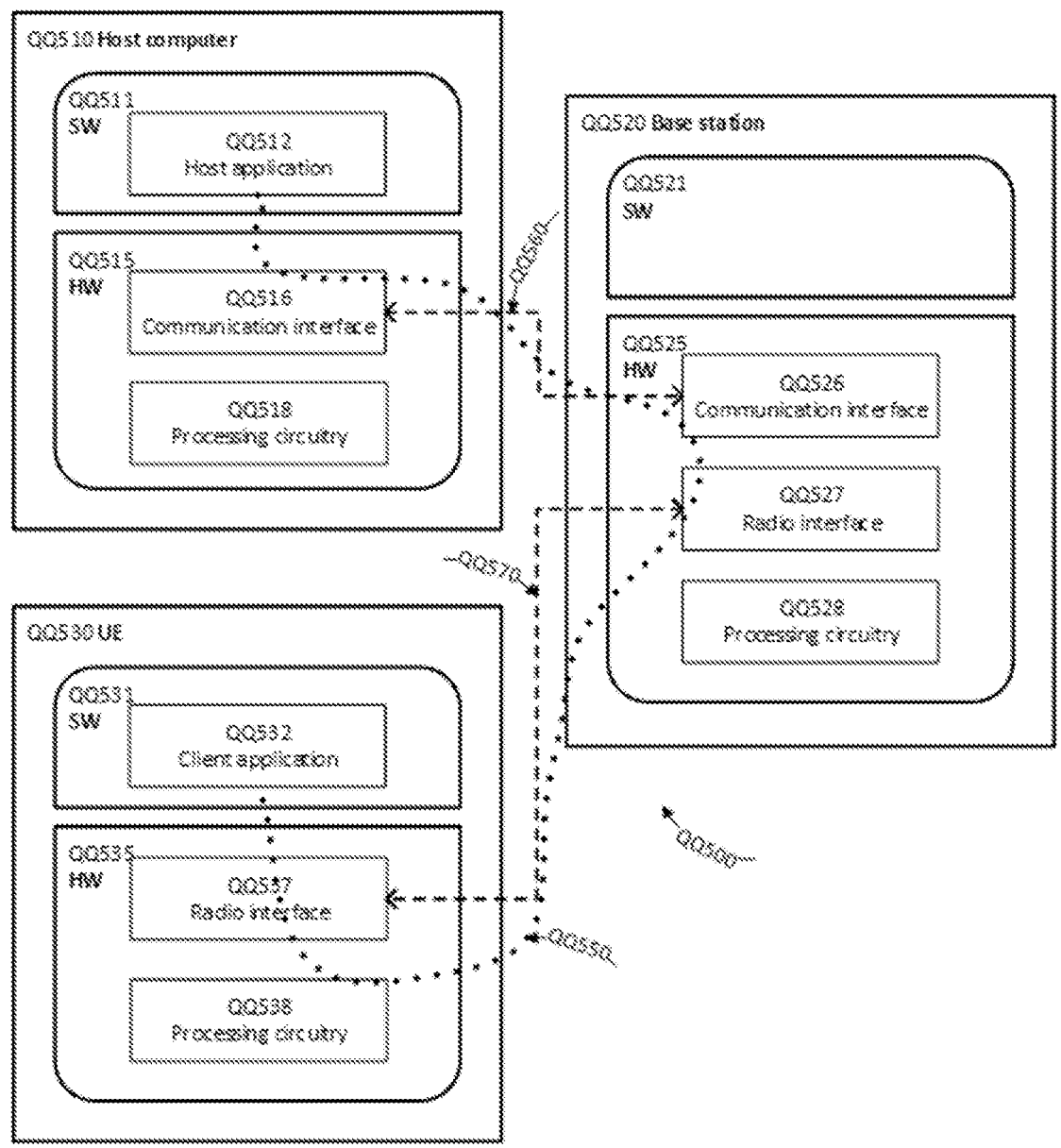
FIG. 16 is a generalized block diagram of a host computer communicating via a base station with a user equipment over a partially wireless connection.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network). Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the data rate and latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 17, 18:
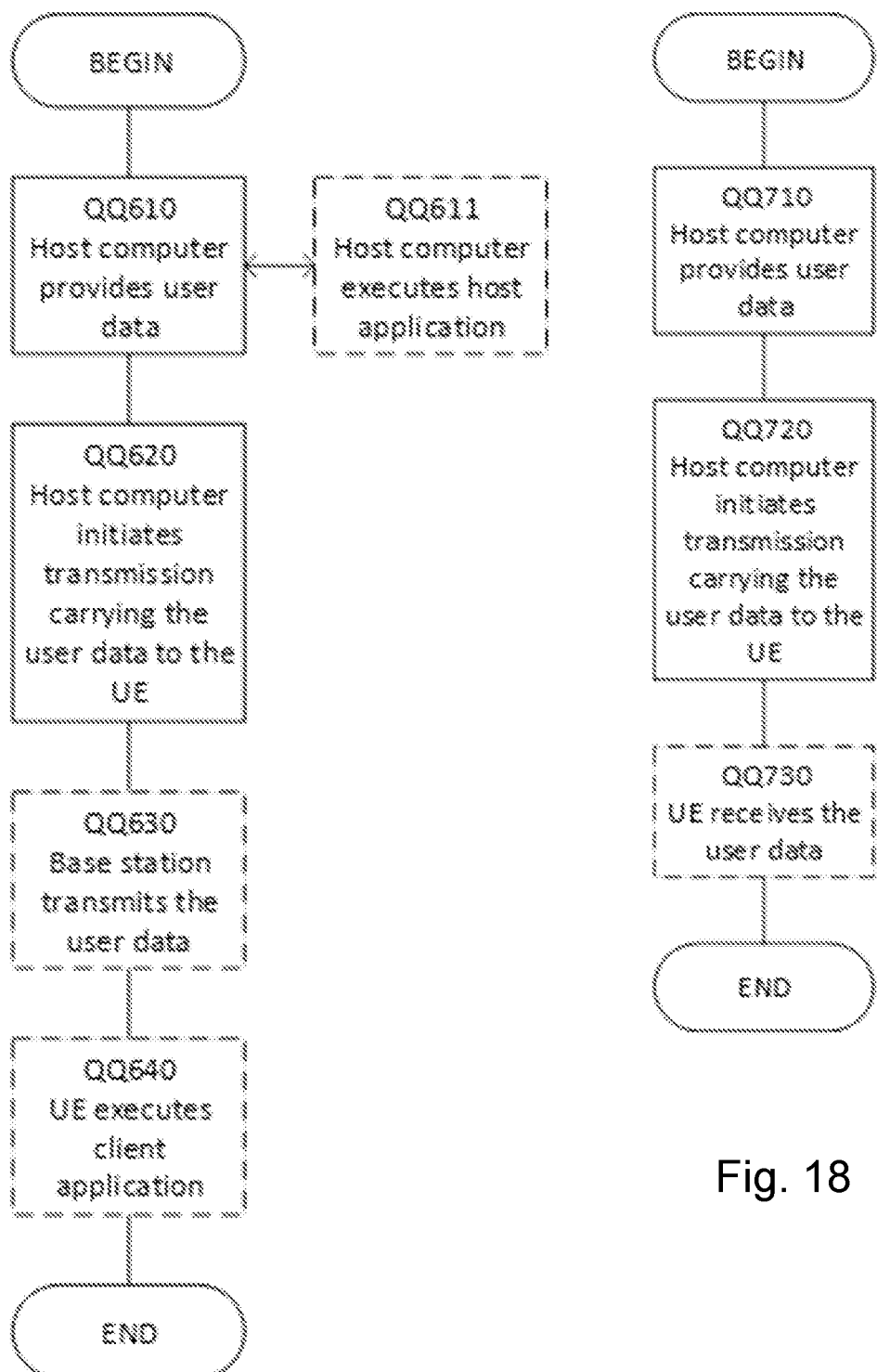
FIGS. 17-20 are flowcharts illustrating methods implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIGS. 15 and 10. For simplicity of the present disclosure, only drawing references to FIG. 17 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 10. For simplicity of the present disclosure, only drawing references to FIG. 18 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 19, 20:
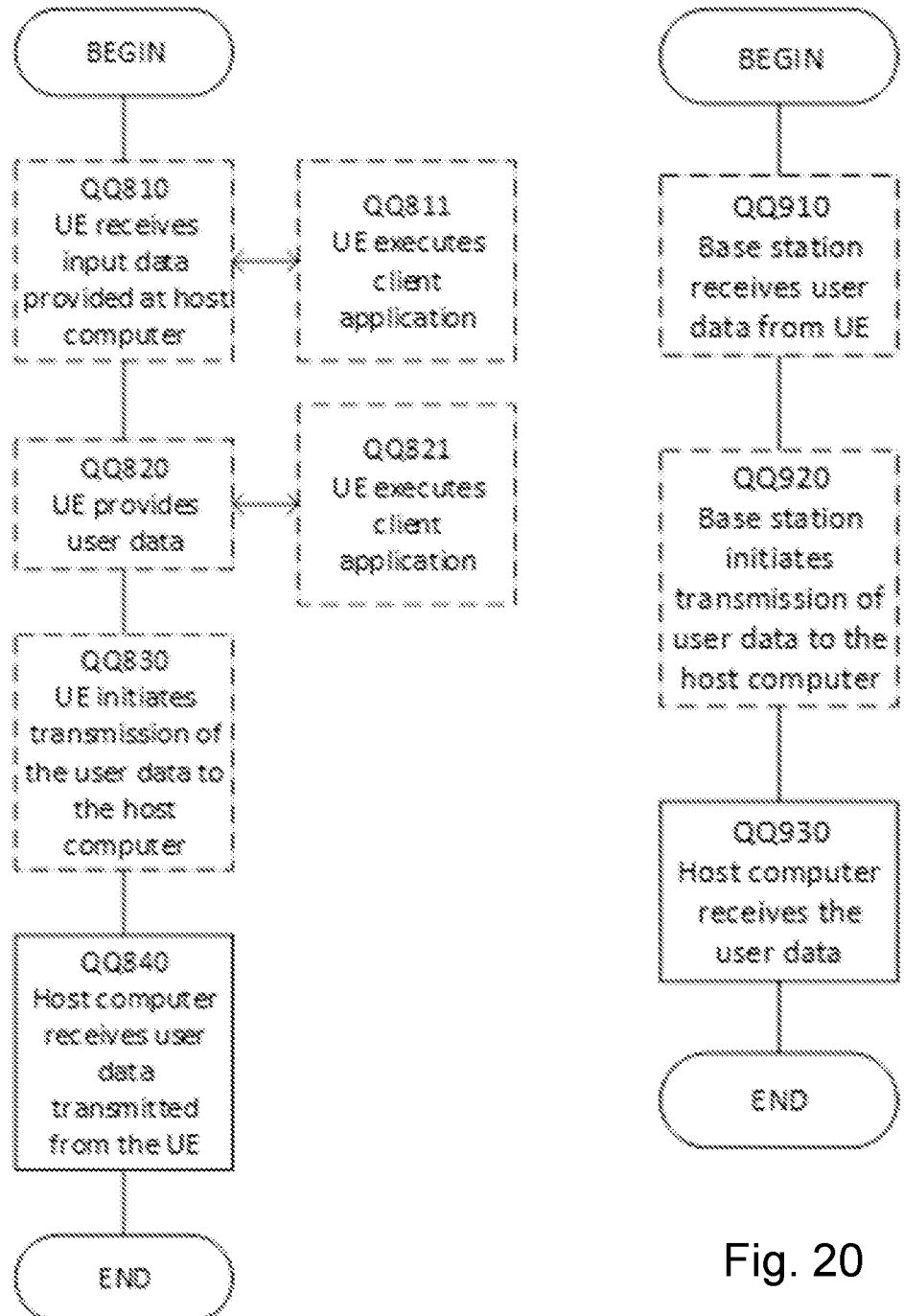

FIG. 19 is a flowchart illustrating a method implemented in a communication system, in accordance with one embodiment. The communication system includes a host computer, a base station and a UE which may be those described with reference to FIGS. 15 and 10. For simplicity of the present disclosure, only drawing references to FIG. 19 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 10. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Further Aspect of Some Embodiments

The embodiments described above refer to Propagation Delay, PD, compensation for reference time information delivery and issues related to PD compensation for clock synchronization which is further described below.

Timing Advance, TA, based methods are utilized for PD compensation for the time synchronization accuracy analysis described in the 3GPP standard document TR 38.825, Sec. 6.3.2.4. Here, the achievable time synchronization accuracy over Uu interface is enough if following RAN2 analysis on the overall time synchronization accuracy from sync master to UE, e.g. from first wireless device 121 to the second wireless device 122, as captured in 3GPP standard document TR 38.825, Sec. 6.3.5. As the evaluation results on timing synchronization accuracy described in the 3GPP standard document TR 38.825, Sec. 6.3.2.4 may be achieved without additional Rel-16 enhancements in addition to the required propagation delay compensation support, RAN1 sees no need for additional enhancements in Rel-16. However, it should be noted that the analysis in the 3GPP standard document TR 38.825, Sec. 6.3.5 was a generic analysis triggered long before SA2 has finalized the synchronization solution, see e.g. FIG. 5.27.1-1 in 3GPP standard document TS 23.501, Sec. 5.27. In the analysis in the 3GPP standard document TR 38.825, Sec. 6.3.2.4, only two network-interface related inaccuracy parts are considered: inaccuracy on the Uu interface including downlink delay compensation and granularity of signalled reference timing; and Inaccuracy on the network interface between 5G GM clock and gNB which sends the reference timing to the UE.

There are some missing inaccuracy components from, such as, the delivery of the 5G GM to the UPF, time stamping inaccuracy at DS-TT/NW-TT, the delivery of the time information to the gNB's radio unit from the gNB's baseband unit, the delivery of the time information to the end-station from the UE's radio interface, etc. Due to remote TSN GM clock entity, additional errors may be coupled at 5GS ingress (from TSN GM to NW-TT) with transportation over n hops of PTP as described in 3GPP standard document TR 38.825, Sec. 6.3.4.1. Since these components are implementation- and deployment-related, to exactly estimate or even put requirements on each inaccuracy component might be challenging. Nevertheless, without taking into account of the missing inaccuracy components, the existing analysis of Uu interface inaccuracy cannot be used to conclude if, and how much, improvements may be necessary in order to meet the end-to-end accuracy requirement. Hence, the inaccuracy analysis in the 3GPP standard document TR 38.825, Sec. 6.3.2.4 is incomplete and cannot be used to conclude on the need of enhancing downlink delay compensation.

Some embodiments herein address that the overall end-to-end inaccuracy (TSN grandmaster node to end-station connected to UE) might easily go beyond 1 us, considering that the inaccuracy on the air-interface (545 ns) already take half of the budget and uncertainty contributions from all possible components of the end-to-end path have not been accounted for. From deployment point of view, a much smaller air-interface inaccuracy provides the potential for supporting more use cases and increase the chances of satisfying the most demanding clock sync requirement when time synchronization deployments are realized.

Some requirements stipulate that a wireless communications networks supporting 5G shall be able to support arbitrary placement of sync master functionality and sync device functionality in integrated 5G/non-3GPP TSN networks. Some requirement also stipulate that wireless communications networks supporting 5G shall be able to support clock synchronization through the network if the sync master and the sync devices are served by different UEs, i.e. flow of clock synchronization messages is in either direction, UL and DL. This requirements indicates that the sync master can be located behind a UE. The clock synchronization message flow may have to pass two Uu interfaces. Therefore, this halves the error budget available for the Uu interfaces compared to the Rel-16 requirements. Such UE-to-UE E2E path with two air interfaces thus pose much tighter requirements. In conclusion, existing TA methods may be utilized to apply PD compensation but the satisfaction of E2E 1 μs time synchronization budget cannot be guaranteed. Further, without knowing the Uu budget, any enhancement or proposal on existing PD compensation methods may pose a risk in creating inadequate methods that does not satisfy the E2E time-synch requirement of <=1 μs [2], when considering the requirements. Hence, there is a need of PD compensation enhancement beyond current TA-based methods. However, without knowing the Uu time synchronization budget, any enhancements or proposals may be inadequate when E2E time-synchronization requirements cannot be satisfied in reality.

Figure 21:
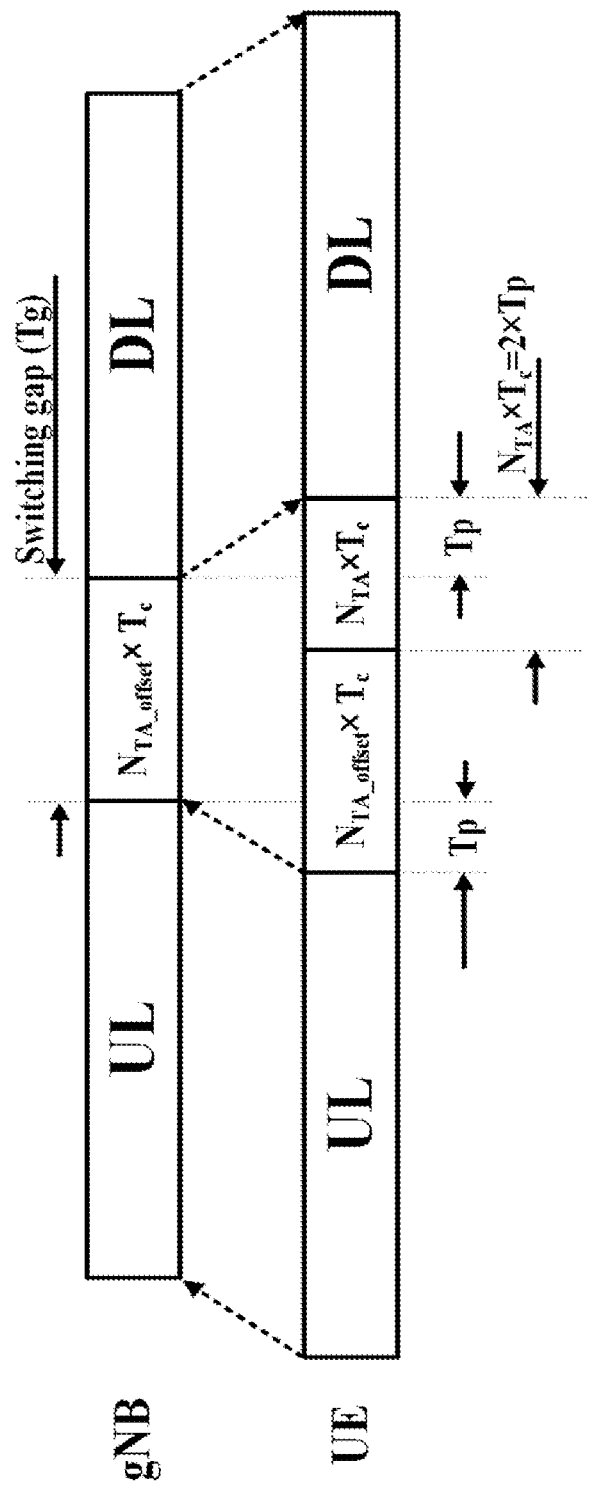
FIG. 21 is a schematic illustration of an example of an UL and DL timing relationship between a network node and a first wireless device.

Regarding TDD aspects of TA-based compensation, the timing of TDD operation is analysed below with reference to FIG. 21. FIG. 21 illustrates the UL and DL timing relationship at the gNB and UE using a timing advance with $T_{TA}=(N_{TA}+N_{TA,offset})T_c$. The UE is equipped with time offset $N_{TA,offset}$ for downlink and uplink switching (n-TimingAdvanceOffset) in ServingCellConfigCommon IE, which a UE would typically acquire from SSB, MIB, or SIBs when accessing the cell from IDLE. If the RRC field n-TimingAdvanceOffset is absent, the UE applies a default value defined for the duplex mode and frequency range of the serving cell. For FR1 TDD band without LTE-NR coexistence case, the default value is $N_{TA,offset}=25600$ (Tc). For FR2, the default value is $N_{TA,offset}=13792$ (Tc). Thus, the value of $N_{TA,offset}$ is a cell-specific value and known to all UEs in the cell. For TDD UE, the offset TA allows the TX-to-RX and RX-to-RX transition time. This may be seen in Table 2 from 3GPP standard document TS 38.211 V15.6.0, Table 4.3.2-3: Transition time $N_{Rx-Tx}$ and $N_{Tx-Rx}$.

TABLE 2

| Transition time | FR1 | FR2 |
| --- | --- | --- |
| $N_{Tx-Rx}$ | 25600 | 13792 |
| $N_{Rx-Tx}$ | 25600 | 13792 |

While for TDD operation, the UL timing is advanced by $T_{TA}=(N_{TA}+N_{TA,offset})T_c$ relative to the DL timing at the UE, the timing advance command from the gNB provides $N_{TA}$. Thus, the UE is still able to derive propagation delay Tp from $N_{TA}$, $T_p=N_{TA} \times T_c/2$. Therefore, there is a need for any special treatment for TDD operation as both TA command (for $N_{TA}$) and the offset ($N_{TA,offset}$) are at UE disposal. Similar to FDD operation, the TA command also provides round-trip time measurement for TDD operation. No special treatment is needed to obtain propagation delay estimate for TDD.

According to some embodiments, it is therefore concluded that the inaccuracy analysis in the 3GPP standard document TR 38.825, Sec. 6.3.2.4 may be incomplete and may not be used to conclude on the need of enhancing downlink delay compensation. It is also concluded that there may be a need of PD compensation enhancement beyond current TA-based methods. However, without knowing the Uu time synchronization budget, any enhancements or proposals may be inadequate when E2E time-synchronization requirements cannot be satisfied in reality. It is further concluded that an investigation of clock synchronization error budget for Uu and other components may be necessary before enhancements may be introduced for satisfying the new, stricter, requirements in Release-17. Furthermore, it is also concluded that, similar to FDD operation, the TA command also provides round-trip time measurement for TDD operation.

Yet Further Aspects of Some Embodiments

According to some embodiments, a first user equipment (UE) for enabling a timing reference in a second UE for use in Device-to-Device/Sidelink, D2D/SL, transmissions over a D2D/SL communication link with the first UE is provided. The first UE may comprise: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the method described in FIG. 5; an input interface connected to the processing circuitry and configured to allow input of information into the first UE to be processed by the processing circuitry; an output interface connected to the processing circuitry and configured to output information from the first UE that has been processed by the processing circuitry; and a battery connected to the processing circuitry and configured to supply power to the first UE. According to some embodiments, a second user equipment (UE) for obtaining a timing reference for use in Device-to-Device/Sidelink, D2D/SL, transmissions over a D2D/SL communication link with a first UE. The second UE may comprise: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the method described in FIG. 7; an input interface connected to the processing circuitry and configured to allow input of information into the second UE to be processed by the processing circuitry; an output interface connected to the processing circuitry and configured to output information from the second UE that has been processed by the processing circuitry; and a battery connected to the processing circuitry and configured to supply power to the second UE. According to some embodiments, a communication system including a host computer is provided. The communication system comprises: processing circuitry configured to provide user data; and a communication interface configured to forward the user data to a cellular network for transmission to at least one user equipment (UE), wherein the cellular network comprises a base station having a radio interface and processing circuitry, the base station's processing circuitry configured to perform any of the steps of the methods described with reference to FIG. 2. This communication system may further include the base station. Also, the communication system may further including at least one UE, wherein the at least one UE is configured to communicate with the base station. Further, in the communication system, the processing circuitry of the host computer may be configured to execute a host application, thereby providing the user data; and the at least one UE may comprise processing circuitry configured to execute a client application associated with the host application. According to another embodiment, a method implemented in a communication system including a host computer, a base station and a user equipment (UE) is provided. The method may comprise: at the host computer, providing user data; and at the host computer, initiating a transmission carrying the user data to the UE via a cellular network comprising the base station, wherein the base station performs any of the steps of the methods described with reference to FIG. 2 above. The method may comprise, at the base station, transmitting the user data. Further, in the method, the user data may be provided at the host computer by executing a host application. Additionally, the method may further comprise, at the UE, executing a client application associated with the host application. According to a further embodiment, a user equipment (UE) configured to communicate with a base station is provided. The UE may comprise a radio interface and processing circuitry configured to perform the method as described with reference to FIG. 5 or 7. According to yet a further embodiment, a communication system including a host computer is provided. The communication system comprise processing circuitry configured to provide user data, and a communication interface configured to forward user data to a cellular network for transmission to a user equipment (UE), wherein the UE comprises a radio interface and processing circuitry, the UE's components configured to perform any of the steps of any of the methods described with reference to FIG. 5 or 7. In the communication system, the cellular network may further include a base station configured to communicate with the UE. In some embodiments, the processing circuitry of the host computer may be configured to execute a host application, thereby providing the user data; and the UE's processing circuitry may be configured to execute a client application associated with the host application. According to yet another embodiment, a method implemented in a communication system including a host computer, a base station and a user equipment (UE) is provided. The method may comprise: at the host computer, providing user data; and at the host computer, initiating a transmission carrying the user data to the UE via a cellular network comprising the base station, wherein the UE performs any of the steps of the methods described with reference to FIG. 5 or 7 above. The method may comprise, at the UE, receiving the user data from the base station. According to yet another embodiment, a communication system including a host computer is provided. The communication system comprises a communication interface configured to receive user data originating from a transmission from a user equipment (UE) to a base station, wherein the UE comprises a radio interface and processing circuitry, the UE's processing circuitry configured to perform any of the steps of the methods described with reference to FIG. 5 or 7 above. The communication system may also include the UE. Also, the communication system may include the base station, wherein the base station comprises a radio interface configured to communicate with the UE and a communication interface configured to forward to the host computer the user data carried by a transmission from the UE to the base station. In some embodiments, the processing circuitry of the host computer may be configured to execute a host application; and the UE's processing circuitry may be configured to execute a client application associated with the host application, thereby providing the user data. In some embodiments, the processing circuitry of the host computer is configured to execute a host application, thereby providing request data; and the UE's processing circuitry is configured to execute a client application associated with the host application, thereby providing the user data in response to the request data. According to yet another embodiment, a method implemented in a communication system including a host computer, a base station and a user equipment (UE) is provided. The method may comprise: at the host computer, receiving user data transmitted to the base station from the UE, wherein the UE performs any of the steps of the methods described with reference to FIG. 5 or 7 above. In some embodiments, the method may comprise, at the UE, providing the user data to the base station. In some embodiments, the method may comprise, at the UE, executing a client application, thereby providing the user data to be transmitted; and, at the host computer, executing a host application associated with the client application. In some embodiments, the method may comprise, at the UE, executing a client application; and at the UE, receiving input data to the client application, the input data being provided at the host computer by executing a host application associated with the client application, wherein the user data to be transmitted is provided by the client application in response to the input data. According to yet another embodiment, a communication system including a host computer comprising a communication interface configured to receive user data originating from a transmission from a user equipment (UE) to a base station is provided, wherein the base station comprises a radio interface and processing circuitry, the base station's processing circuitry configured to perform any of the steps of the methods described with reference to FIG. 2 above. In some embodiments, the communications system further includes the base station. In some embodiments, the communications system further includes the UE, wherein the UE is configured to communicate with the base station. In some embodiments, the processing circuitry of the host computer is configured to execute a host application; and the UE is configured to execute a client application associated with the host application, thereby providing the user data to be received by the host computer. According to yet another embodiment, a method implemented in a communication system including a host computer, a base station and a user equipment (UE) is provided. The method may comprise: at the host computer, receiving, from the base station, user data originating from a transmission which the base station has received from the UE, wherein the UE performs any of the steps of the methods described with reference to FIG. 5 or 7 above. In some embodiments, the method may comprise at the base station, receiving the user data from the UE. some embodiments, the method may comprise at the base station, initiating a transmission of the received user data to the host computer. The embodiments herein are not limited to the above described preferred embodiments. Various alternatives, modifications and equivalents may be used. Therefore, the above embodiments should not be construed as limiting.

Abbreviations

At least some of the following abbreviations may be used in this disclosure. If there is an inconsistency between abbreviations, preference should be given to how it is used above. If listed multiple times below, the first listing should be preferred over any subsequent listing(s).

ID Identity
LTE Long-Term Evolution
NR New Radio
TSN Time Sensitive Network
PD Propagation Delay
PTP Precision Time Protocol
TA Timing Advance
TTI Transmission Time Interval
UE User Equipment
URLLC Ultra-Reliable and Low-Latency Communications
D2D Device-To-Device
SL Sidelink
UL Uplink
DL Downlink
IIoT Industrial Internet of Things
1×RTT CDMA2000 1×Radio Transmission Technology
3GPP 3rd Generation Partnership Project
5G 5th Generation
DL Downlink
eNB E-UTRAN NodeB
E-UTRA Evolved UTRA
E-UTRAN Evolved UTRAN
FDD Frequency Division Duplex
gNB Base station in NR
LTE Long-Term Evolution
MAC Medium Access Control
NR New Radio
RAN Radio Access Network
RRC Radio Resource Control
SI System Information
SIB System Information Block
SNR Signal to Noise Ratio
TDD Time Division Duplex
UE User Equipment
UL Uplink
UMTS Universal Mobile Telecommunication System
UTRA Universal Terrestrial Radio Access
UTRAN Universal Terrestrial Radio Access Network

The invention claimed is:

1. A network node for enabling a timing reference in a second wireless device for use in Sidelink (SL) transmissions over a SL communication link with a first wireless device, the network node comprising:
processing circuitry configured to:
estimate a propagation delay of SL transmissions over the SL communication link between the first and second wireless device; and
transmit, to the second wireless device, timing reference information based on a timing reference originating from a time reference node in a wireless communications network, and on the estimated propagation delay of SL transmissions over the SL communication link between the first and second wireless device.

2. The network node according to claim 1, wherein the transmitted timing reference information comprises an absolute or relative Timing Advance (TA) command.

3. The network node according to claim 1, wherein the processing circuitry is further configured to:
obtain radio signal measurements from each of the first and second wireless device, wherein the radio signal measurements are one or more of: Angle-of-Arrival (AoA) measurements, radial distances measurements, Signal-to-Noise-Ratios (SNRs), and Reference Signal Receive Powers (RSRPs); and
estimate the propagation delay based on the obtained radio signal measurements.

4. The network node according to claim 1, wherein the processing circuitry is further configured to, in case the second wireless device is provided with an uplink timing reference for uplink transmissions to the network node, perform a transmission resource allocation for uplink transmissions and SL transmissions in the second wireless device such that there is a minimum time resource gap between the resource allocation of the uplink transmissions and the resource allocation of the SL transmissions.

5. The network node according to claim 1, wherein the time reference node is a Time-Sensitive Network (TSN) node in the wireless communications network.

6. A first wireless device configured for use in a wireless communication network for enabling a timing reference in a second wireless device for use in Sidelink (SL) transmissions over a SL communication link with the first wireless device, the first wireless device comprising:
processing circuitry configured to:
obtain information indicating that a timing reference in the second wireless device is to be updated; and
transmit, to the second wireless device, timing reference information based on a timing reference originating from a time reference node in the wireless communication network, and on a propagation delay of SL transmissions over the SL communication link between the first and second wireless device.

7. The first wireless device according to claim 6, wherein the obtained information indicates that no timing reference exists in the second wireless device, that a periodicity timer associated with a timing reference for the second wireless device has expired, that the timing reference in the second wireless device is no longer accurate, or that a movement of the first and/or second wireless device that exceeds one or more distance threshold values has been registered.

8. The first wireless device according to claim 6, wherein the transmitted timing reference information comprises an absolute or relative Timing Advance (TA) command.

9. The first wireless device according to claim 6, wherein the processing circuitry is further configured to obtain the propagation delay of SL transmissions over the SL communication link between the first and second wireless device by performing a Timing Advance (TA) procedure or a Round-Trip-Time (RTT) measurement procedure towards the second wireless device.

10. The first wireless device according to claim 9, wherein the processing circuitry is further configured to repeat the obtaining of a propagation delay and the transmission of timing reference information when a misalignment of transmitted data packets in SL transmissions over the SL communication link from the second wireless device has been detected.

11. The first wireless device according to claim 6, wherein the processing circuitry is further configured to, in case the second wireless device is provided with an uplink timing reference for uplink transmissions to a network node in a wireless communications network, perform one or more of the following:
    prioritize at least one of an uplink transmission or a SL transmission in case the uplink timing reference and timing reference for the SL transmissions cause the uplink transmission and SL transmission to overlap in time;
    transmit an uplink transmission and a SL transmission on different transmission frequency resources in case the uplink timing reference and timing reference for the SL transmissions cause the uplink transmission and SL transmission to overlap in time; and
    transmit a non-prioritized SL transmission without using the timing reference for the SL transmissions in case the uplink timing reference and timing reference for the SL transmissions cause the uplink transmission and the SL transmission to overlap in time.

12. The first wireless device according to claim 6, wherein the time reference node is a Time-Sensitive Network (TSN) node in the wireless communications network.

13. The network node according to claim 1, wherein the transmitted timing reference information comprises a sidelink Timing Advance (TA) command, and wherein the time reference node is a Time-Sensitive Network (TSN) node in the wireless communications network.

14. A second wireless device for obtaining a timing reference for use in Sidelink (SL) transmissions over a SL communication link with a first wireless device, the second wireless device comprising:
    processing circuitry configured to:
        receive timing reference information based on a timing reference originating from a time reference node in a wireless communications network, and on information indicating a propagation delay of SL transmissions over the SL communication link between the first and second wireless device; and
        obtain a timing reference based on the received timing reference information.

15. The second wireless device according to claim 14, wherein information indicating a propagation delay is a propagation delay of SL transmissions over the SL communication link between the first and second wireless device received from the first wireless device, or an estimated propagation delay of SL transmissions over the SL communication link between the first and second wireless device received from a network node in the wireless communications network.

16. The second wireless device according to claim 14, wherein received timing reference information comprises an absolute or relative Timing Advance (TA) command.

17. The second wireless device according to claim 14, wherein the processing circuitry is further configured to use the obtained timing reference in SL transmissions over the SL communication link between the first and second wireless device.

18. The second wireless device according to claim 14, wherein the processing circuitry is further configured to transmit, to the first wireless device or a network node in the wireless communications network, information indicating that a timing reference in the second wireless device is to be updated.

19. The second wireless device according to claim 18, wherein the transmitted information indicates that no timing reference exists in the second wireless device, that a periodicity timer associated with a timing reference for the second wireless device has expired, that the timing reference in the second wireless device is no longer accurate, or that a movement of the second wireless device that exceeds a distance threshold value has been registered.

20. The second wireless device according to claim 14, wherein the processing circuitry is further configured to, in case the second wireless device is provided with an uplink timing reference for uplink transmissions to a network node in a wireless communications network, perform one or more of the following:
    prioritize at least one of an uplink transmission or a SL transmission in case the uplink timing reference and timing reference for the SL transmissions cause the uplink transmission and SL transmission to overlap in time;
    transmit an uplink transmission and a SL transmission on different transmission frequency resources in case the uplink timing reference and timing reference for the SL transmissions cause the uplink transmission and SL transmission to overlap in time; and
    transmit a non-prioritized SL transmission without using the timing reference for the SL transmissions in case the uplink timing reference and timing reference for the SL transmissions cause the uplink transmission and the SL transmission to overlap in time.

21. The second wireless device according to claim 14, wherein the time reference node is a Time-Sensitive Network (TSN) node in the wireless communications network.

22. The second wireless device according to claim 14, the processing circuitry further configured to perform egress time stamping using the time reference.

23. The second wireless device according to claim 14, the processing circuitry configured to receive the timing reference information from a network node in the wireless communications network.

* * * * *